US011089292B2

(12) United States Patent
Price et al.

(10) Patent No.: US 11,089,292 B2
(45) Date of Patent: Aug. 10, 2021

(54) CONFIGURABLE CAMERA STIMULATION AND METROLOGY APPARATUS AND METHOD THEREFOR

(71) Applicant: Optikos Corporation, Wakefield, MA (US)

(72) Inventors: John Price, Hingham, MA (US); David Imrie, Andover, MA (US)

(73) Assignee: Optikos Corporation, Wakefield, MA (US)

( * ) Notice: Subject to any disclaimer, the term of this patent is extended or adjusted under 35 U.S.C. 154(b) by 279 days.

(21) Appl. No.: 16/257,272

(22) Filed: Jan. 25, 2019

(65) Prior Publication Data
US 2019/0238830 A1    Aug. 1, 2019

Related U.S. Application Data

(60) Provisional application No. 62/622,625, filed on Jan. 26, 2018.

(51) Int. Cl.
*H04N 17/00* (2006.01)
*H04N 5/225* (2006.01)
(Continued)

(52) U.S. Cl.
CPC ........... *H04N 17/002* (2013.01); *F16M 11/02* (2013.01); *G01M 11/0207* (2013.01);
(Continued)

(58) Field of Classification Search
CPC .... H04N 17/00; H04N 17/002; H04N 5/2251; H04N 5/2254; H04N 5/2253;
(Continued)

(56) References Cited

U.S. PATENT DOCUMENTS 5,649,258 A * 7/1997 Bergstresser .......... G03B 17/02
396/429
7,158,170 B2 * 1/2007 Gustavsson .......... H04N 17/002
348/187

(Continued)

*Primary Examiner* — Roy M Punnoose
(74) *Attorney, Agent, or Firm* — Perman & Green, LLP

(57) ABSTRACT

A camera metrology apparatus including a base section, a drive section with independent drive axes, and an actuation platform having a camera mount, with a predetermined camera mount interface for a camera, and a camera stimulation source mount, with a predetermined stimulation source mount interface, and being coupled to one of the drive axes to generate relative motion between each interface effecting metrology measurement of the camera, wherein the actuation platform has a selectable configuration between different predetermined platform configurations, each with different predetermined mounting location characteristics changing a predetermined mounting location of the camera mount interface or stimulation source mount interface and effecting a different predetermined metrology measurement characteristic, and the camera mount and the camera stimulation source mount are arranged to define a repeatable relative position between the camera mount interface and stimulation source mount interface in each platform configuration and effect free selection between each platform configuration.

42 Claims, 18 Drawing Sheets

(51) Int. Cl.
  *G03B 17/56*  (2021.01)
  *F16M 11/02* (2006.01)
  *G01M 11/02* (2006.01)
  *G03B 43/00* (2021.01)

(52) U.S. Cl.
  CPC ........... *G03B 17/561* (2013.01); *G03B 43/00* (2013.01); *H04N 5/2251* (2013.01); *H04N 5/2253* (2013.01); *H04N 5/2254* (2013.01)

(58) Field of Classification Search
  CPC . G03B 43/00; G03B 17/561; G01M 11/0207; F16M 11/02
  USPC ........................................................ 356/127
  See application file for complete search history.

(56) References Cited

U.S. PATENT DOCUMENTS

| | | | |
|---|---|---|---|
| 7,486,309 B2 * | 2/2009 | Knoedgen | H04N 17/002 348/187 |
| 10,142,621 B2 * | 11/2018 | Aharon | G01M 11/0257 |
| 10,347,514 B2 * | 7/2019 | Koch | H05K 13/0813 |
| 10,750,165 B2 * | 8/2020 | Fiebig | G06F 30/20 |
| 2004/0189812 A1 * | 9/2004 | Gustavsson | H04N 17/002 348/207.99 |
| 2010/0127078 A1 * | 5/2010 | Brock | G06K 7/10722 235/438 |
| 2013/0317650 A1 * | 11/2013 | Jenkinson | B25J 11/00 700/259 |
| 2014/0240518 A1 * | 8/2014 | Lewinnek | H04N 17/002 348/187 |
| 2019/0182477 A1 * | 6/2019 | Shwartz | H04N 7/181 |
| 2019/0313088 A1 * | 10/2019 | Hong | H04N 17/002 |
| 2019/0340317 A1 * | 11/2019 | Chan | G06T 5/00 |

\* cited by examiner

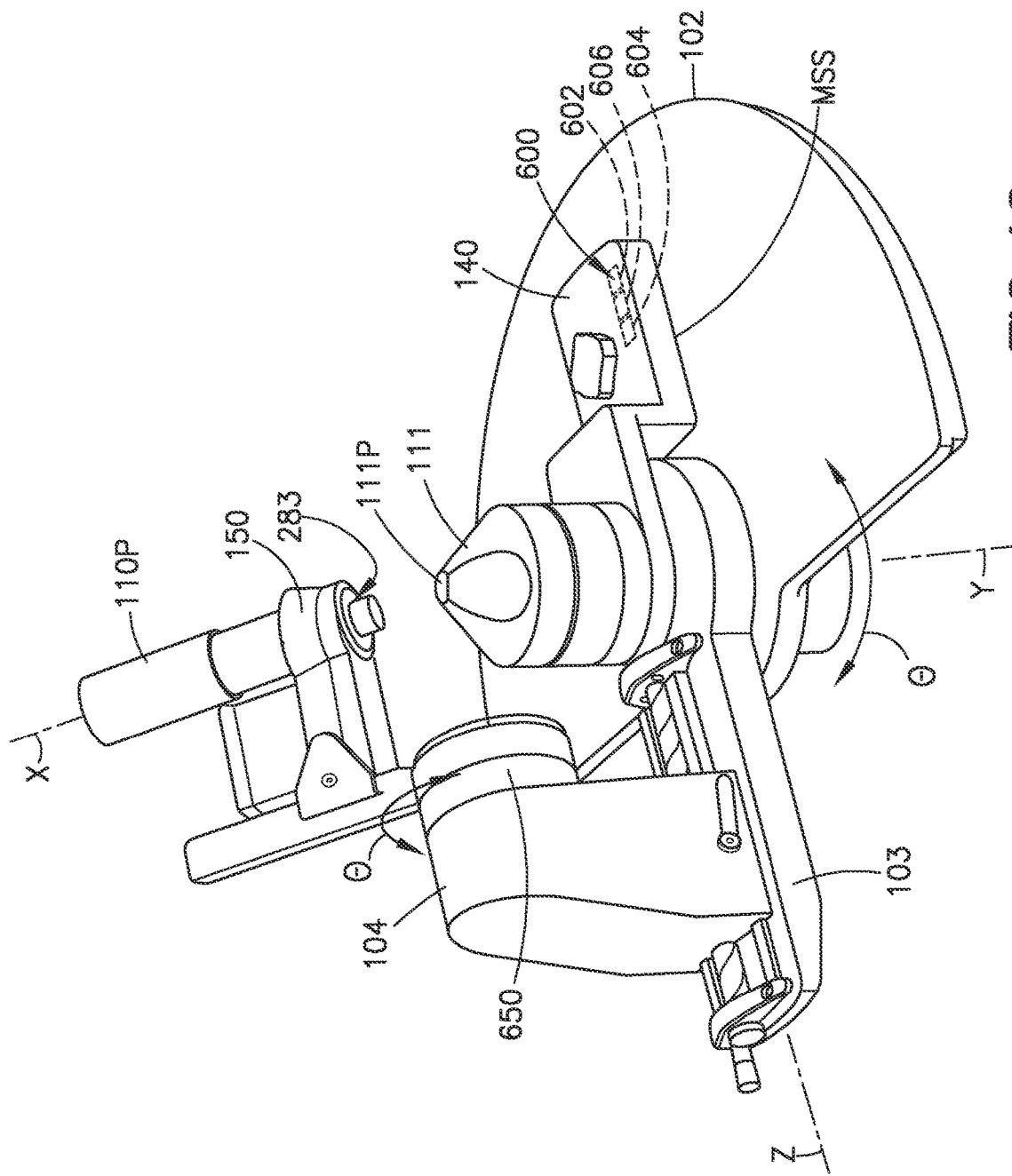

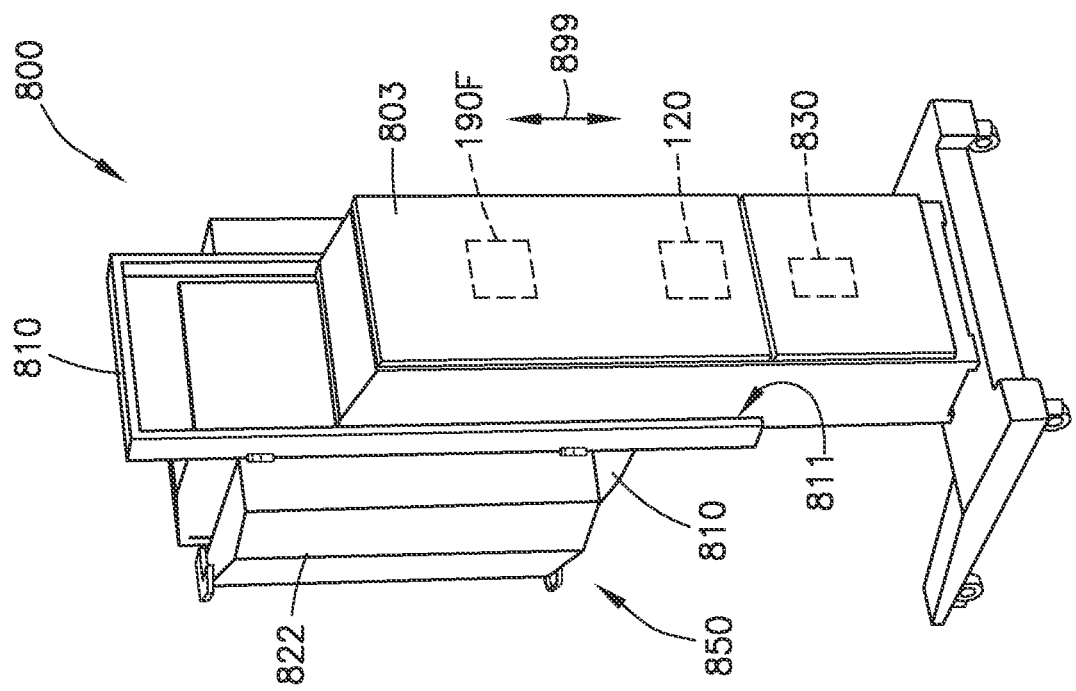
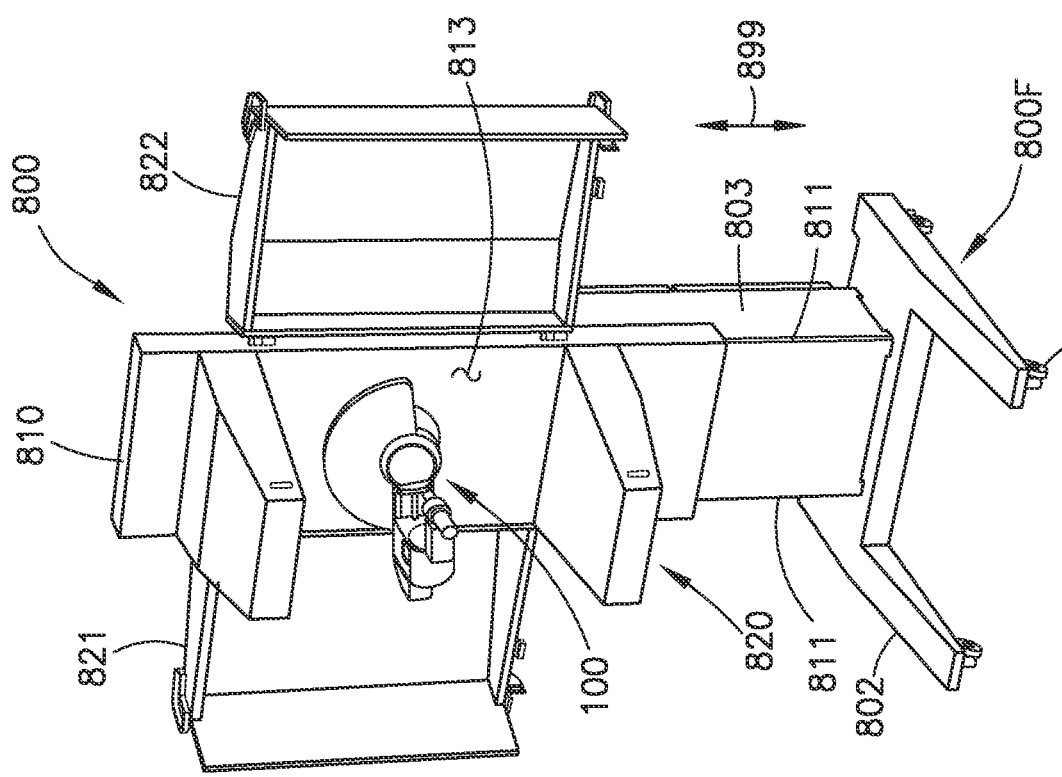

CONFIGURABLE CAMERA STIMULATION AND METROLOGY APPARATUS AND METHOD THEREFOR

CROSS-REFERENCE TO RELATED APPLICATIONS

This application is a non-provisional of, and claims the benefit of, U.S. Provisional Patent Application No. 62/622,625 filed on Jan. 26, 2018, the disclosure of which is incorporated herein by reference in its entirety.

BACKGROUND

1. Field

The exemplary embodiments generally relate to optical testing equipment, more particularly, to optical test equipment for testing cameras.

2. Brief Description of Related Developments

Small aperture cameras are ubiquitous and can be found in, e.g., cell phones, web cams, drone surveillance, machine vision systems, and automobiles. Generally testing of the small aperture cameras is performed with a test station or fixture that is configured for the specific camera system being tested and for a specific test being performed on the camera. Generally, each type/configuration of small camera system has a dedicated test stations where each of the dedicated test stations has a specific configuration for a particular test to be performed on the small camera system. Having multiple series of test stations for each type/configuration of small camera system where each test station in a series is specifically tailored for a particular test leads to increased equipment and maintenance costs. In addition, the many test stations generally needed to test each type/configuration of small camera system requires floor space for the operation and storage of the test equipment.

It would be advantageous to have a small camera system that is reconfigurable for and able to perform multiple tests on different types/configurations of small camera systems.

BRIEF DESCRIPTION OF THE DRAWINGS

The foregoing aspects and other features of the disclosed embodiment are explained in the following description, taken in connection with the accompanying drawings, wherein:

FIG. 2A illustrates the camera metrology apparatus in an exemplary Cartesian home position for a fixed device under test; FIG. 2D illustrates the camera metrology apparatus in an exemplary Cartesian home position for a moving device under test;

FIGS. 4A, 4B, 4C, and 4D are perspective illustrations of the camera metrology apparatus of FIG. 1 in a spherical polar configuration in accordance with aspects of the present disclosure in accordance with aspects of the present disclosure; FIG. 2A illustrates the camera metrology apparatus in an exemplary spherical polar home position for a fixed device under test; FIG. 2D illustrates the camera metrology apparatus in an exemplary spherical polar home position for a moving device under test;

FIGS. 8A, 8B, 8C, and 8D are perspective illustrations of an enclosure of the camera metrology apparatus of FIG. 1 in accordance with aspects of the present disclosure.

DETAILED DESCRIPTION

Figure 1A:
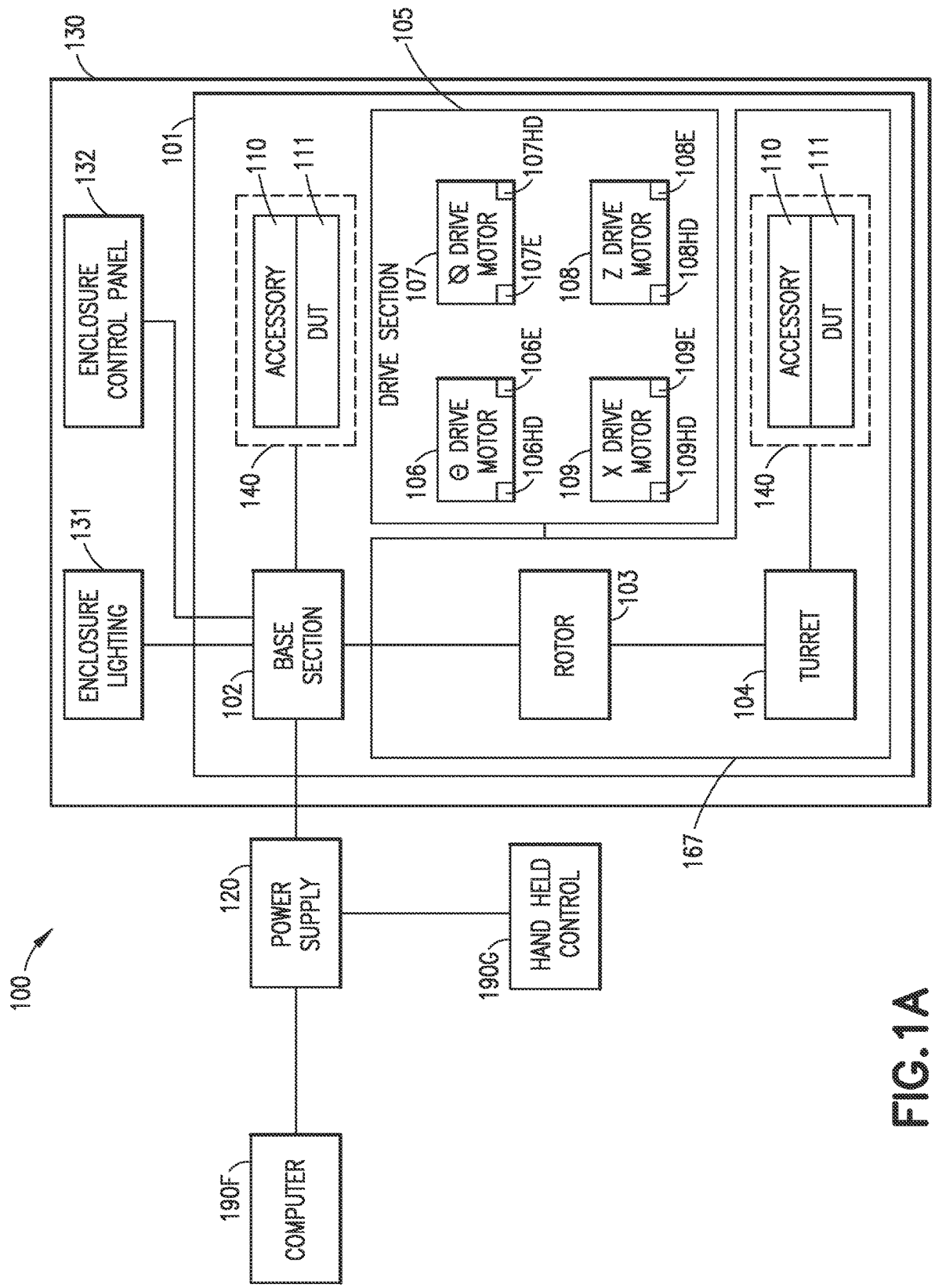
FIG. 1A is a schematic block diagram of a camera metrology apparatus in accordance with aspects of the present disclosure.
Figure 1B:
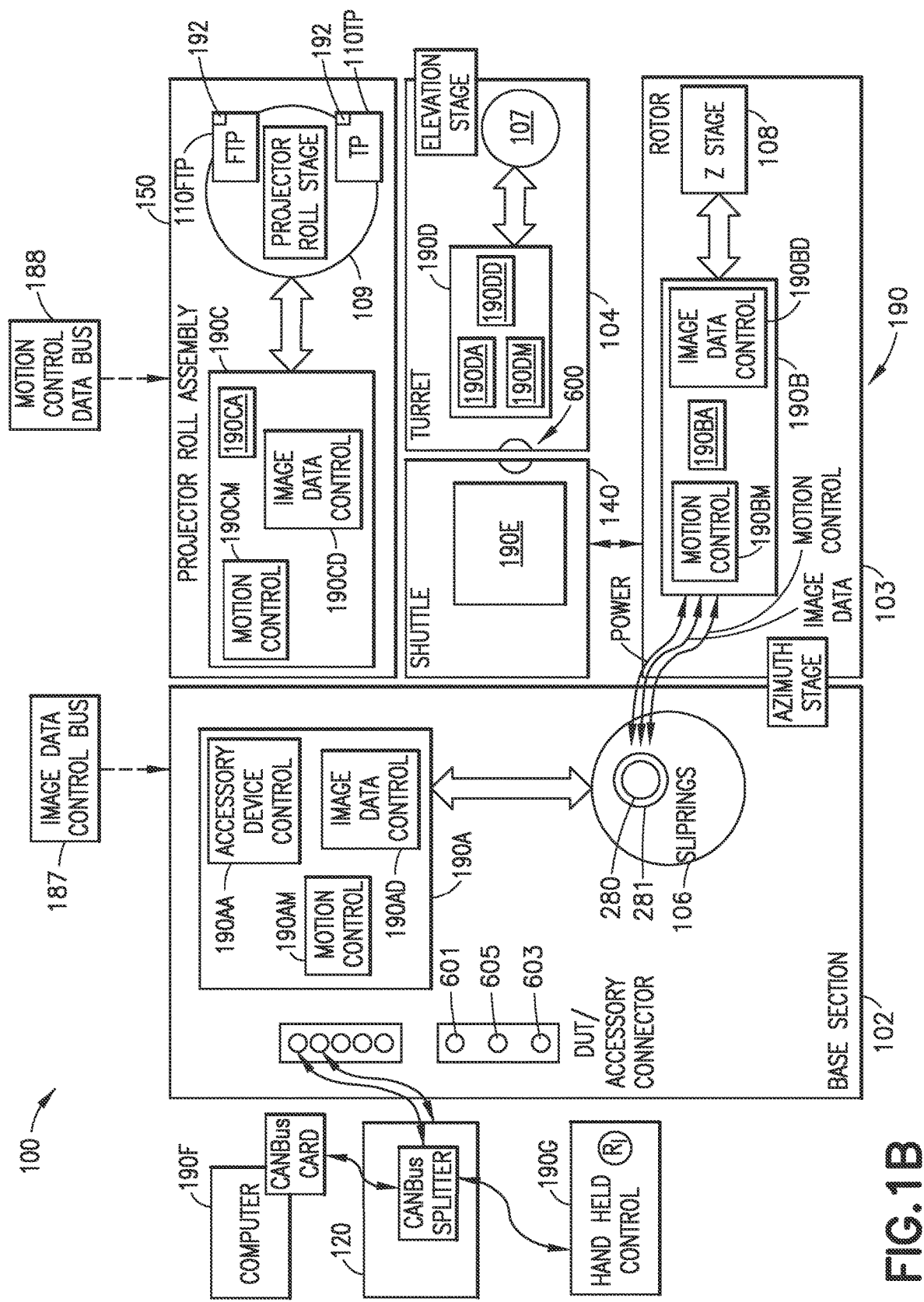
FIG. 1B is a more detailed schematic block diagram of the camera metrology apparatus of FIG. 1 in accordance with aspects of the present disclosure.

FIGS. 1A and 1B illustrate exemplary block diagrams of a camera metrology apparatus 100 in accordance with aspects of the present disclosure. Although the aspects of the present disclosure will be described with reference to the drawings, it should be understood that the aspects of the present disclosure can be embodied in many forms. In addition, any suitable size, shape or type of elements or materials could be used.

The aspects of the present disclosure described herein provide an optical test instrument (i.e., the camera metrology apparatus 100) for metrological testing of small aperture cameras/camera systems (referred to herein as a device under test 111), such as to determine or otherwise test camera/image sensor integration in and performance of the device under test 111. The camera metrology apparatus 100 is configured to project a target 301, 302 (FIGS. 3 and 5) onto a camera (or image) sensor 300 (FIGS. 3 and 5) of the device under test 111 over a wide range of arbitrary object distances and field angles and to rapidly move from one field point to the next. The camera metrology apparatus 100 is configurable so as to have a number of freely selectable performance characteristics that include, but are not limited to, measuring the Modulation Transfer Function (MTF) at any field point on the camera sensor 300, through-focus MTF, geometric imaging parameters such as distortion (or other suitable geometric imaging parameters), stray light performance, the Signal Transfer Function, chromatic functions, camera-to-mount line of sight, and camera-to-mount roll.

Figure 2A:
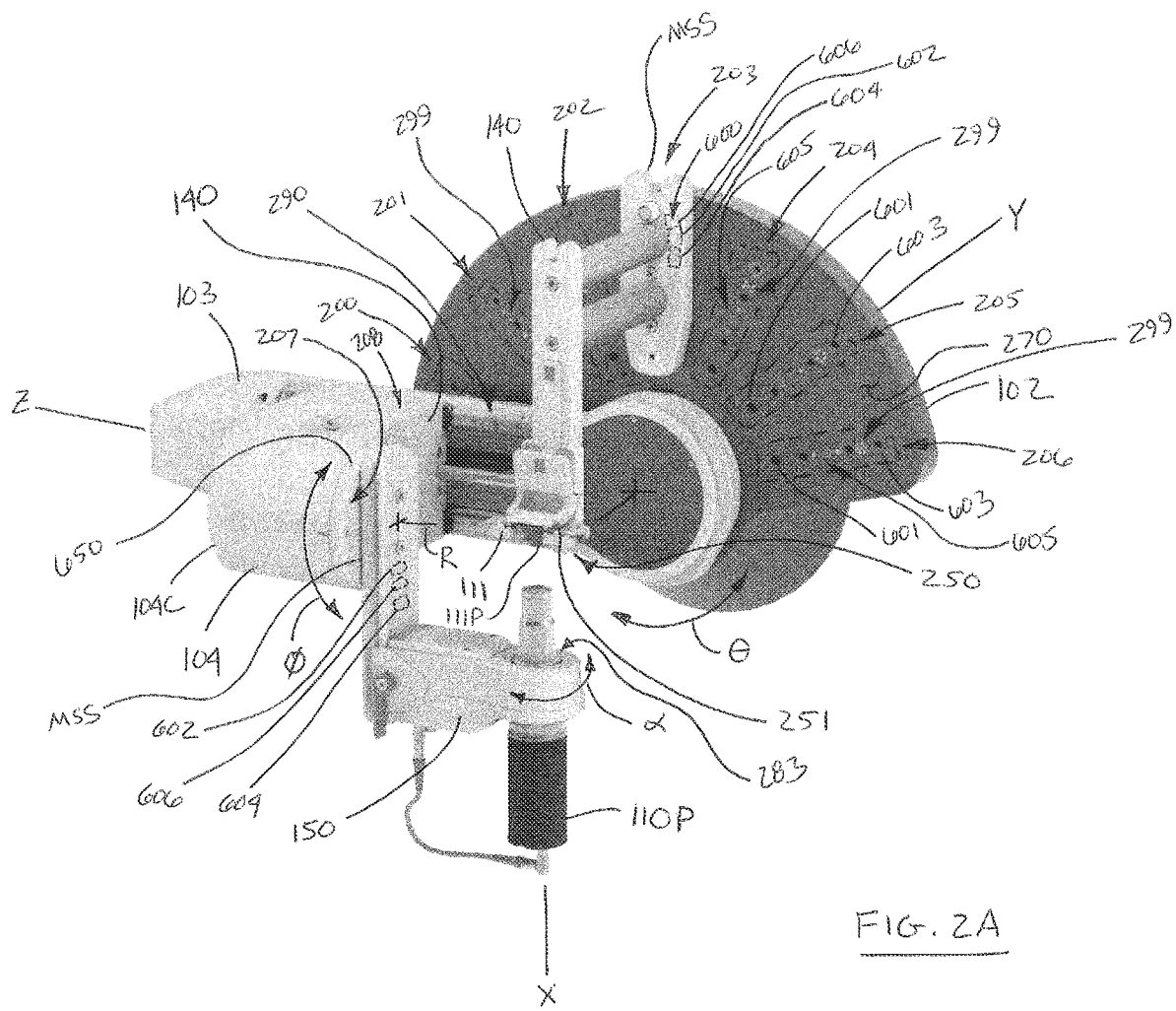
FIGS. 2A, 2B, 2C, and 2D are perspective illustrations of the camera metrology apparatus of FIG. 1 in a Cartesian configuration in accordance with aspects of the present disclosure.
Figure 3:
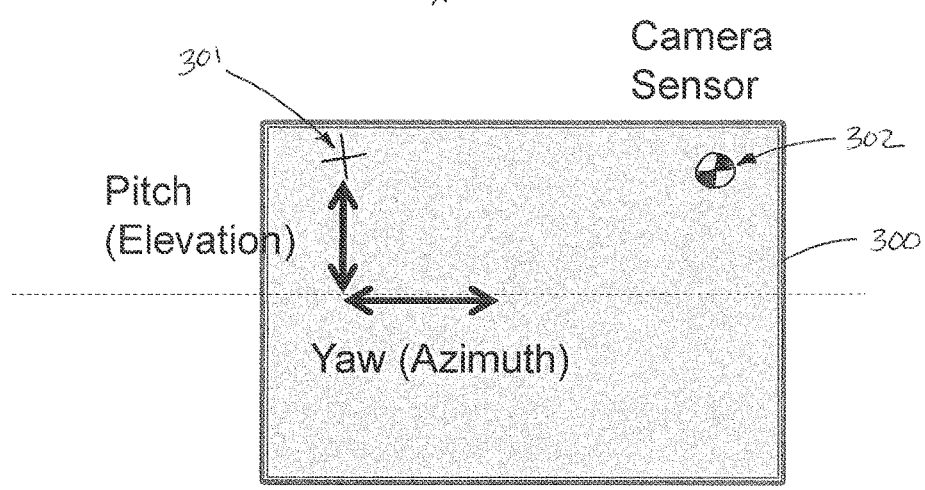
FIG. 3 is a schematic illustration of a Cartesian coordinate system of the camera metrology apparatus of FIGS. 2A-2C projected onto a camera sensor in accordance with aspects of the present disclosure.
Figure 4A:
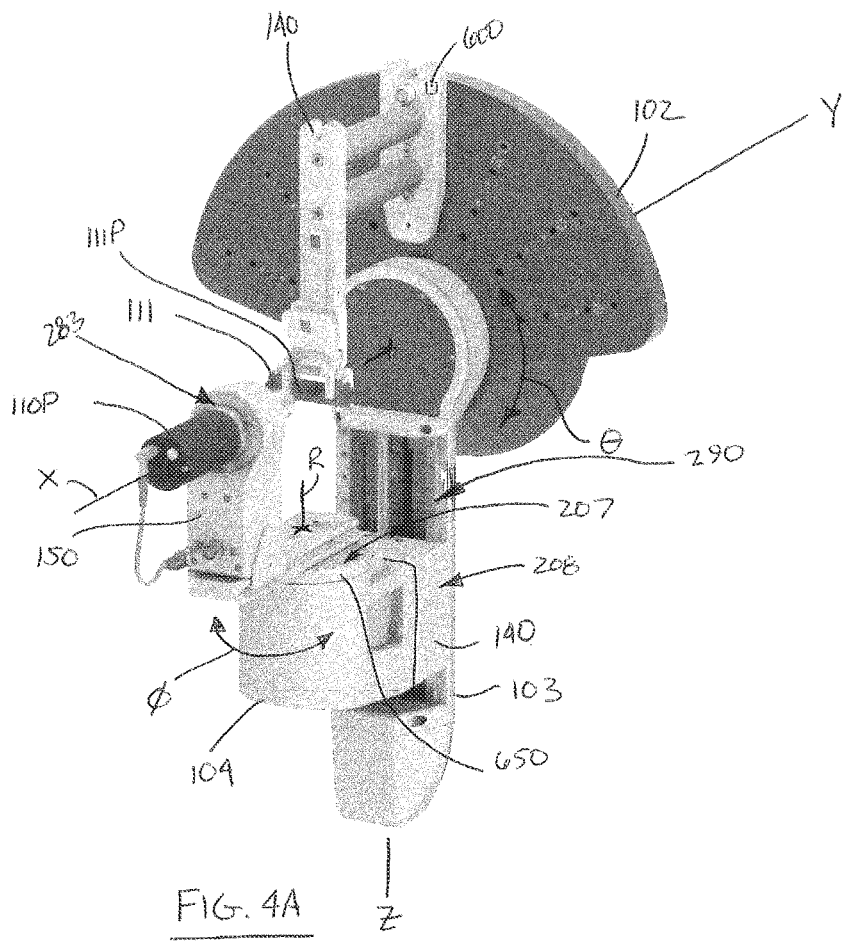
Figure 5:
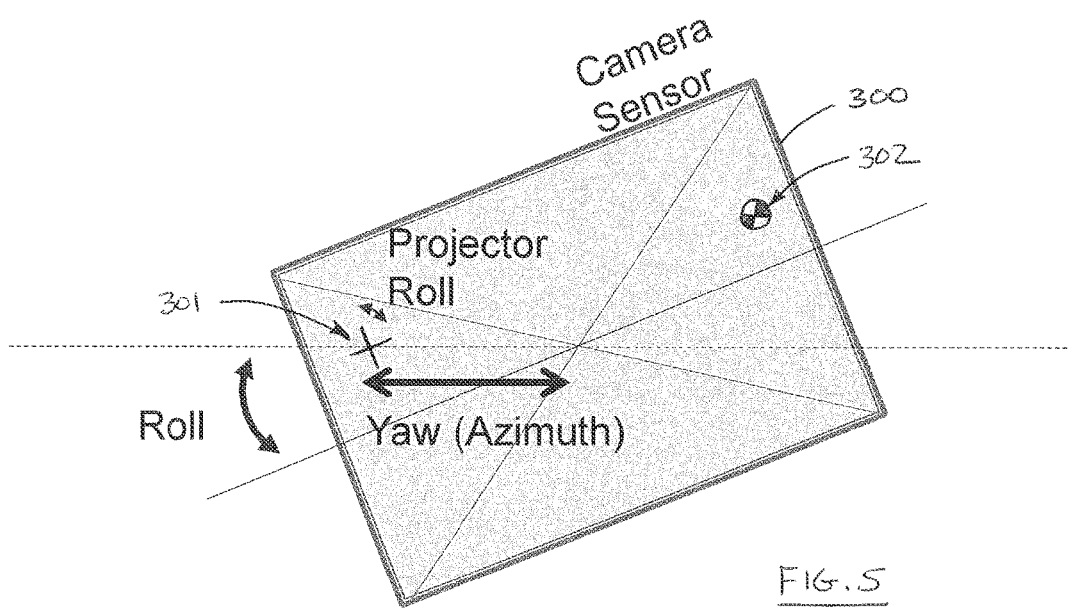
FIG. 5 is a schematic illustration of a spherical polar coordinate system of the camera metrology apparatus of FIGS. 4A-4C projected onto a camera sensor in accordance with aspects of the present disclosure.
Figure 4B:
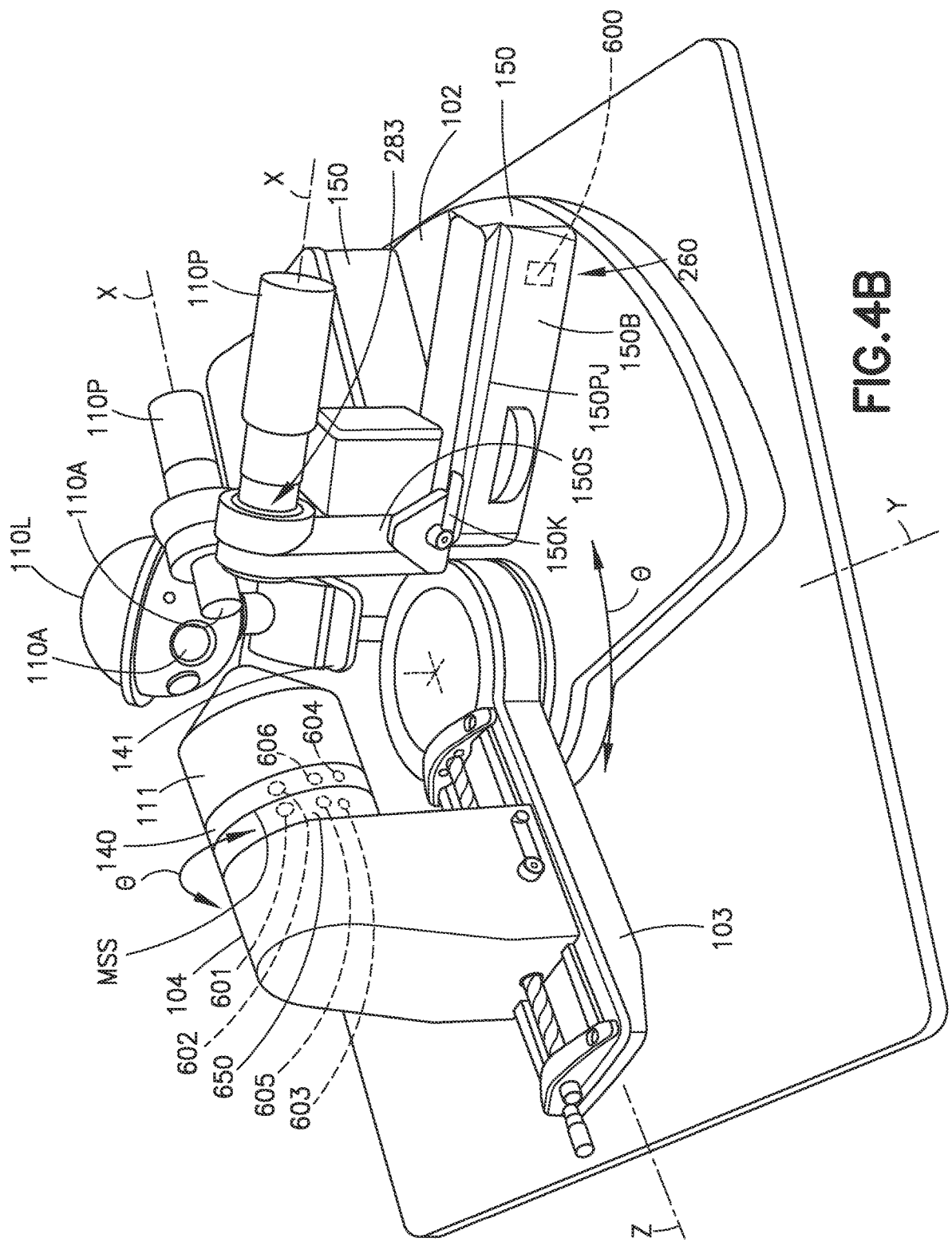
Figure 4D:
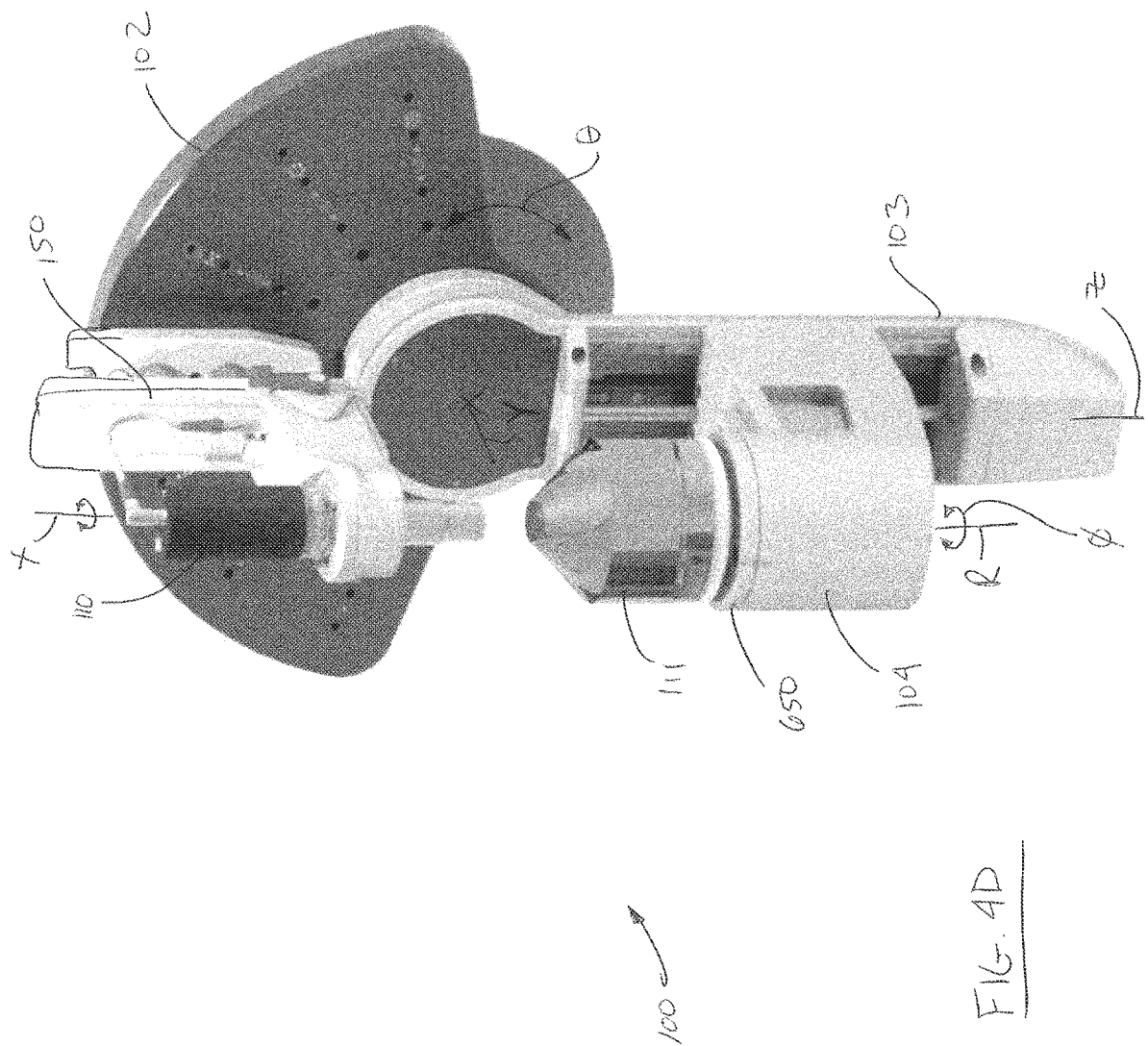

Referring to FIGS. 1A, 1B, 3, and 5, as will be described below, the camera metrology apparatus 100 includes a common configurable platform 101 that includes multiple movable stages. The multiple movable stages effect various movements of the camera metrology apparatus 100 for performing testing with the freely selectable performance characteristics. For example, the camera metrology apparatus 100 is configured to scan, e.g., the camera sensor 300 of the device under test 111 in two degrees of freedom in one of a Cartesian coordinate system (e.g., in a Cartesian configuration as shown in FIGS. 2A-3) and a spherical polar coordinate system (e.g., in a spherical polar configuration as shown in FIG. 4A-5) by either moving the device under test 111 or holding the device under test 111 stationary.

The camera metrology apparatus 100 may include one or more accessory devices 110 to facilitate testing performed with each of the freely selectable performance characteristics. For example, a projector (generally referred to as projector 110P) projects the target 301 (cross-hairs), 302 (cross-edges), or any other suitable target, on the camera sensor 300 of the device under test 111 for MTF measurements. The target 301, 302 may be projected from a projector 110P such as a target projector 110TP or a focusing target projector 110FTP. The camera metrology apparatus 100 includes one or more mounting devices (that are configured to be removably and repeatably mounted to the camera metrology apparatus 100), such as a projector roll assembly 150 to which the projector 110P may be mounted. The projector roll assembly 150 may form an X-axis stage of the actuation platform 167 of the camera metrology apparatus 100.

Figure 7A:
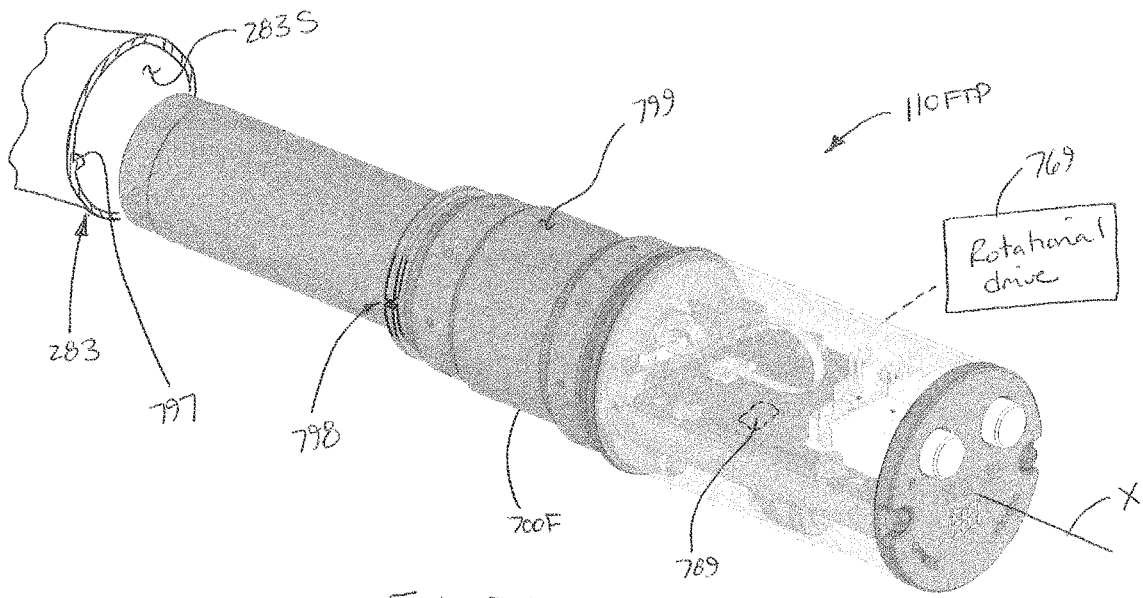
FIG. 7A is a perspective view of an accessory device of the camera metrology apparatus of FIG. 1 in accordance with aspects of the present disclosure.
Figure 7B:
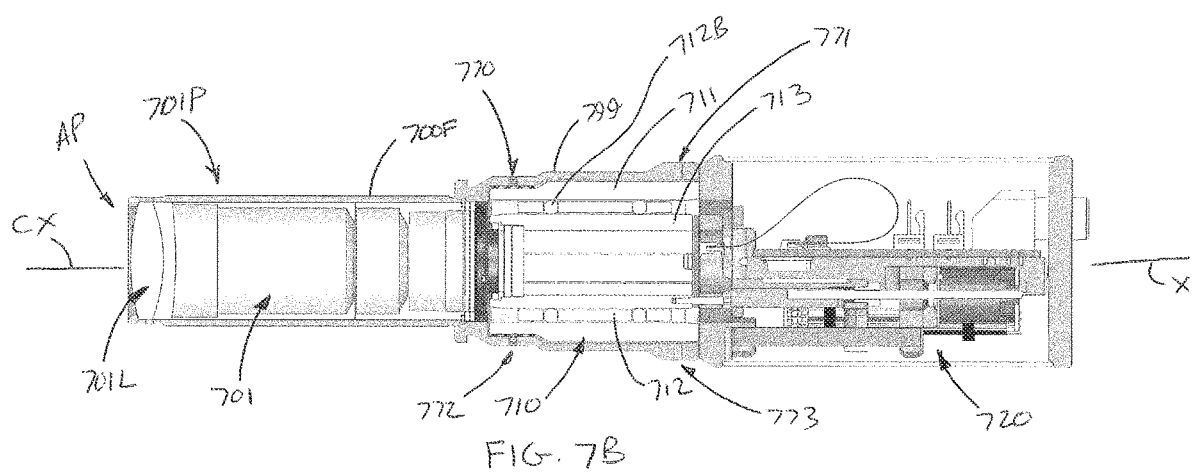
FIGS. 7B and 7C are cross-sectional plan views of the accessory device of FIG. 7A in first and second configurations in accordance with aspects of the present disclosure.
Figure 7C:
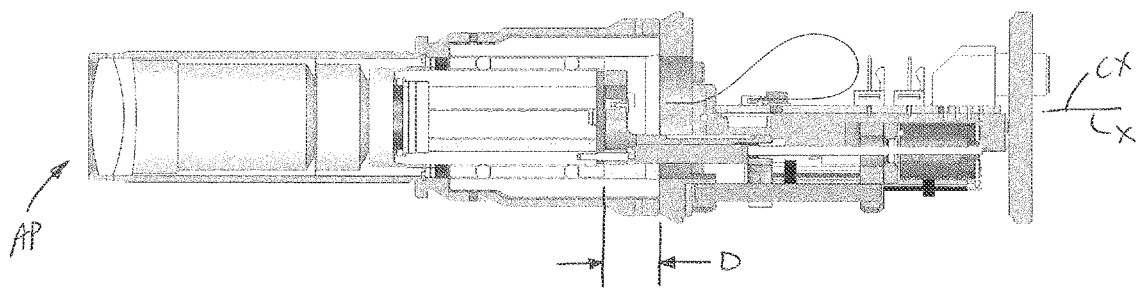
Figure 7D:
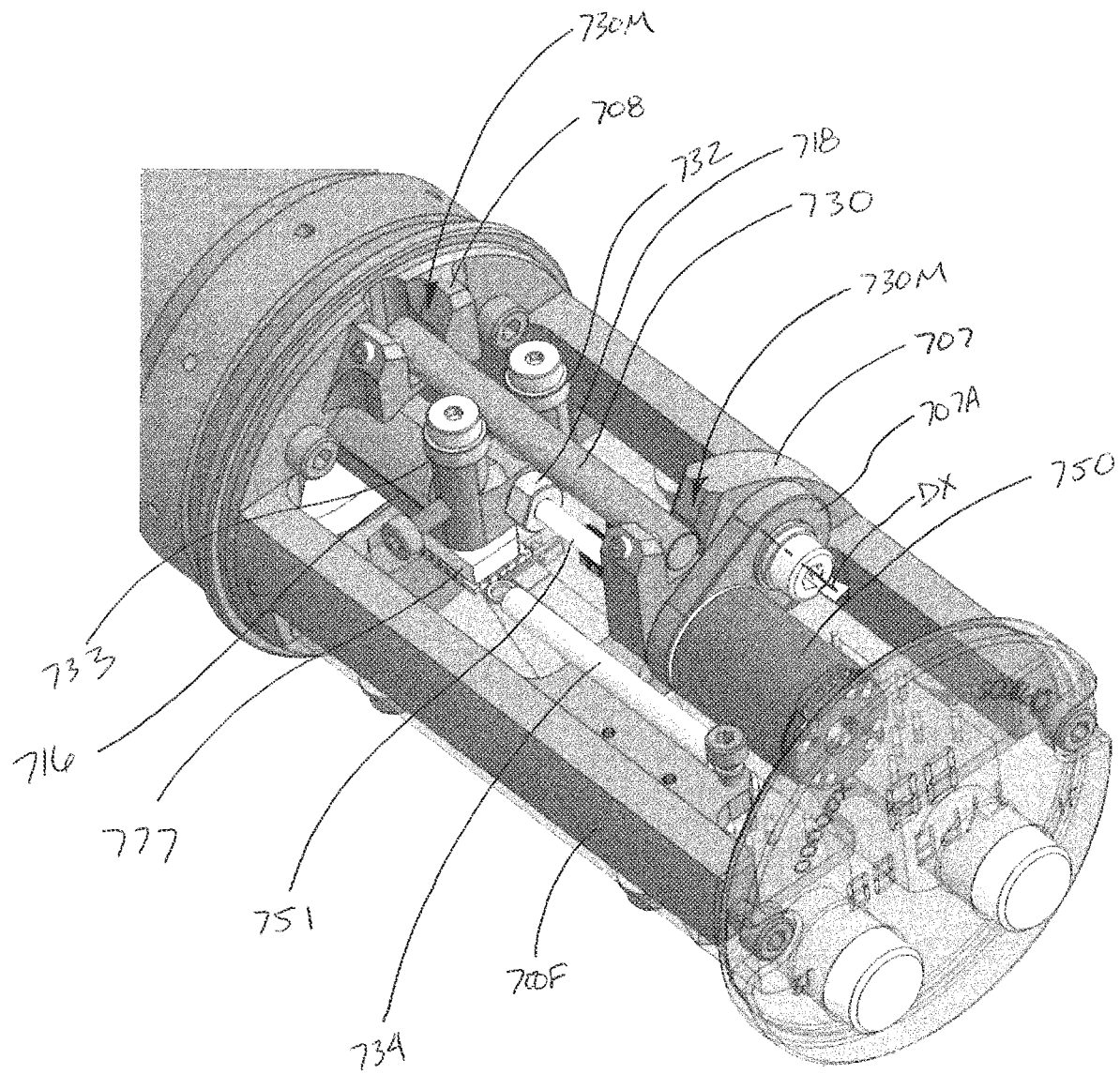
FIGS. 7D, 7E, and 7F are a perspective views of portions of the accessory device of FIG. 7A in accordance with aspects of the present disclosure.
Figure 7E:
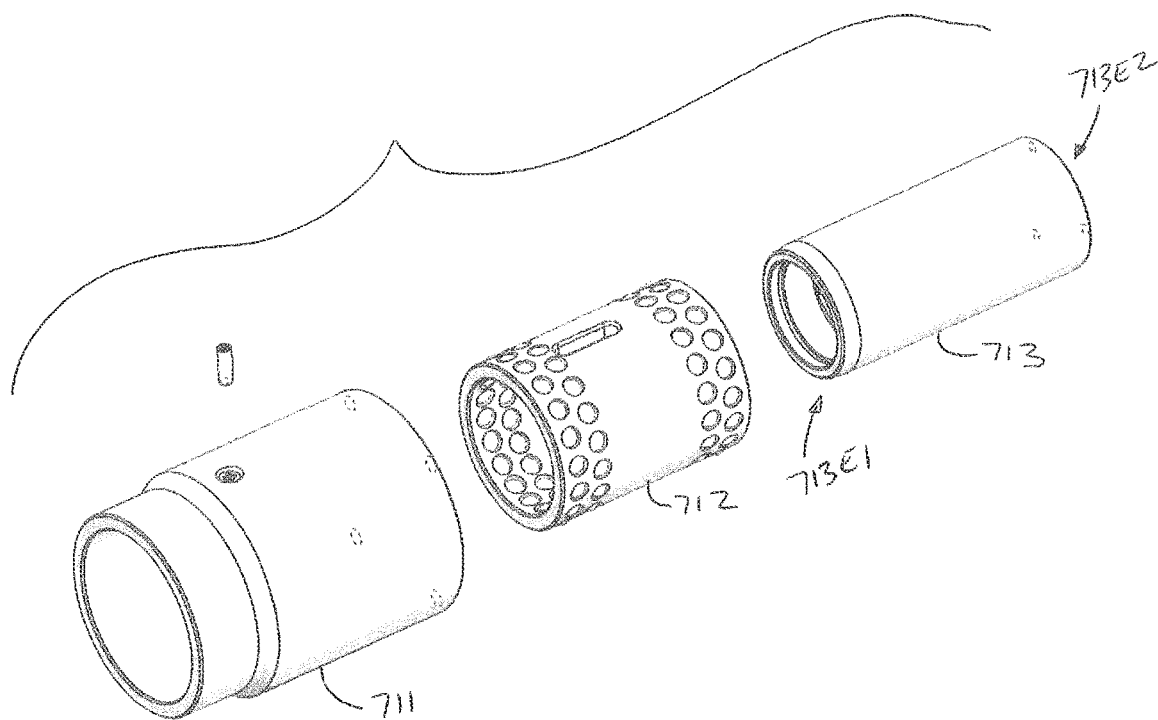
Figure 7F:
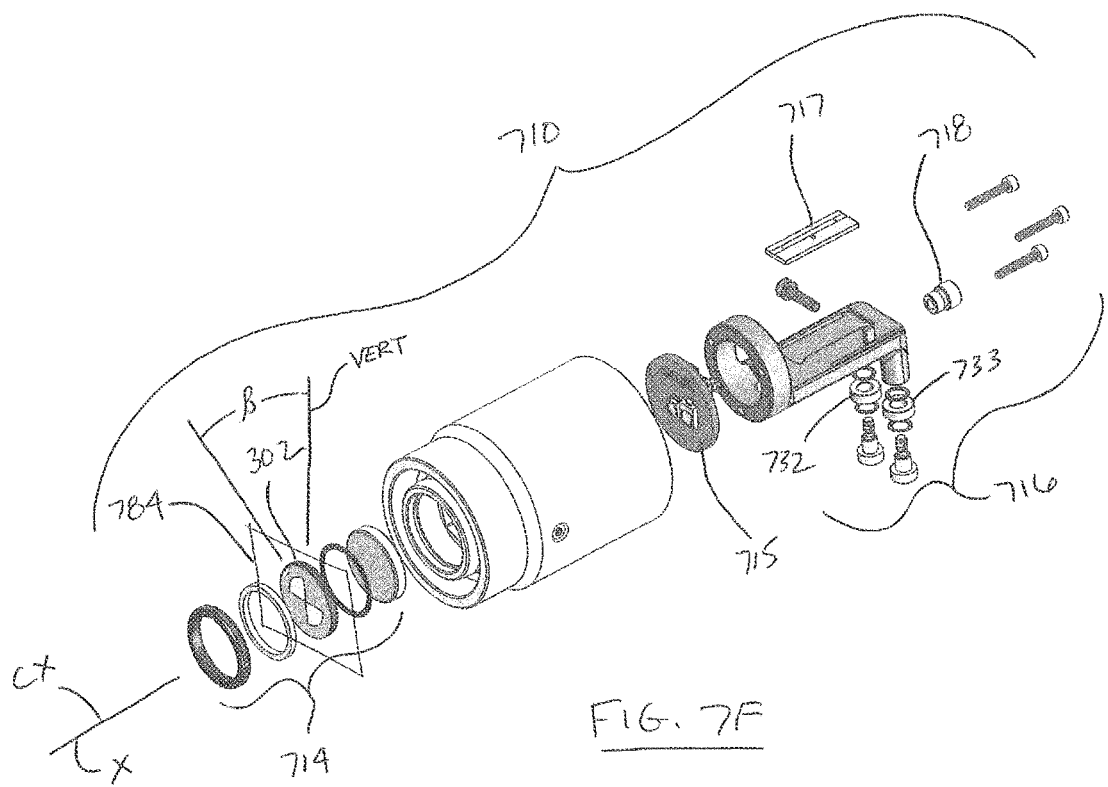

The projector roll assembly 150 has a projector interface that interfaces with a mounting seat (or seating surface(s)) of the accessory device 110 and serves as a datum surface for repeatable mounting of the projector 110P to the projector roll assembly so that the projector 110P is bolt down bore-sighted (e.g., bore-sighted upon mounting the projector 110P to the common configurable platform 101) to the optical system (such as the entrance pupil of the device under test 111) and/or the camera sensor 300 of the device under test 111. The projector interface 283 (see, e.g., FIG. 2A) of the roll projector assembly 150 also "clocks" or rotationally orients the projector 110P so that the target 301, 302 has a predetermined rotational orientation relative to the cameras sensor 300 of the device under test 111. For example, referring to FIG. 7A, the projector 110P, such as the focusing target projector 110FTP, includes a housing 700F that has a coupling surface 799. The interface 283 of the projector roll assembly 150 includes a coupling surface 283S that interfaces with the coupling surface 799 of the projector 110P, where the coupling surfaces 283S, 799 form a mounting interface that positionally aligns (e.g., in pitch and yaw) the projector 110P relative to the projector roll assembly 150 interface 260. The coupling surfaces 283S, 799 also include reciprocal mating features (e.g., a protrusion 797 and recess or slot 798) that positionally align the projector 110P (e.g., in roll about the X axis) relative to, for example, a rotational home or zero position of the interface 283 about the X-axis. The projector roll assembly 150 may also provide rotation of the projector 110P (e.g., through actuation of the X-drive motor 109) so that the target 301, 302 maintains the predetermined rotational orientation relative to the camera sensor 300 (e.g., the projector roll assembly provides field de-rotation) as the device under test 111 or the projector 110P is moved during metrological testing.

As another example, camera sensor 300 stray light and nailing glare measurements may be performed with any other suitable peripheral accessory device 110 such as stimulus source 110L. The stimulus source 110L may be a variable luminance source (VLS) or any suitable device for stimulating the camera sensor 300. The camera metrology apparatus 100 includes one or more mounting devices 141 (see FIG. 4B) (that are configured to be removably and repeatably mounted to the camera metrology apparatus 100), to which the stimulus source may be mounted. In other aspects the stimulus source 110L may be configured to be removably and repeatably mounted to the camera metrology apparatus 100 (e.g., the stimulus source 110L may include an integral mount similar to mounting device 141). The one or more mounting devices 141 may be interchangeably mounted to, for example, a base 102 of the camera metrology apparatus at predetermined mounting stations 200-206 (see FIG. 2A) so that the stimulus source 110L has a predetermined orientation (e.g., relative to the device under test 111) at the respective predetermined mounting station 200-206. The predetermined mounting stations 200-206 may include any suitable kinematic couplings 600 (similar to those shown in FIGS. 6A and 6B) for orienting the stimulus source 110L. The predetermined mounting stations 200-206, and the accessory devices 110, may also be configured so that a controller/control system 190 (described below and generally referred to as controller 190—FIG. 1B) registers the respective accessory device 110 at the respective predetermined mounting station 200-206, where registration includes automatic registration of one or more of the pose of the accessory device 110, the type of accessory device 110 (e.g., a type of stimulus source), a positional calibration of the accessory device 110 at the respective predetermined mounting station 200-206 with the accessory device 110 disposed on the common configurable platform 101, and a common device under test scan/scan routing at the respective predetermined mounting station 200-206.

Other accessory devices 110, such as a calibrated stimulus source for measuring the signal transfer function and a stimulus source for measuring chromatic functions, fixed focus, fixed target projectors (which may or may not include collimators), adjustable focus target projectors (which may or may include collimators), LED (light emitting diode) illuminators, QTH (quartz tungsten halogen) illuminators, VLS (variable light source) illuminators (e.g., for calibrated luminance and low light response measures), thermal IR (infra-red) source and projectors (e.g., for long wavelength infra-red), projection modules (e.g., for bolt-down bore-sighting where the camera may image the entrance pupil 111P), laser pointer modules (e.g., to indicate entrance pupil 111P location), stray light modules, point sources for veiling glare measurements, and relative illumination and chromatic response modules, may be similarly configured. The accessory devices 110 may be mounted as desired to the common configurable platform 101 by coupling, without further calibration of the accessory devices 110, at the predetermined mounting station 200-206 and the resulting camera metrology apparatus 100 configuration is automatically detected to effect metrological testing of the device under test 111 based on a predetermined protocol. In another aspect, one or more accessory devices 110 may be pre-positioned on the common configurable platform 101 depending on the device under test 111 and test protocol to generate a bespoke test protocol.

Referring now to FIGS. 1A, 1B, 2A-2C, and 4A-4C, the camera metrology apparatus 100 includes the common configurable platform 101 having a base section 102, an actuation platform 167, a drive section 105, and a controller 190. The camera metrology apparatus 100 also includes at least one device under test mount 140 and at least one accessory device mount (e.g., such as the projector roll assembly 150 and mounting devices 141). In one aspect, the device under test mounts 140 and the accessory device mounts include controlled couplings 600 (see FIGS. 6A and 6B as described herein) that decouple image data of, for example, the projector 110P onto the device under test 111 camera sensor 300, from encoder data of the drive section 105. For example, the image data may be carried by a separate data bus (e.g., image data control bus 187) than the motion control data (which is carried by motion control data bus 188) (See FIG. 1B). In one aspect, the image data may be handled by control modules or processors 190AD, 190BD, 190CD, 190DD that are substantially independently from control modules or processors 190AM, 190BM, 190CM, 190DM that handle the encoder data for motion control. In a similar manner, data transfer to and from the accessory devices 110 may also be handled independently of the encoder data such as by control modules or processors 190AA, 190BA, 190CA, 190DA. This provides for lower control capacities and demand for data transfer.

The base section 102 may have any suitable shape and size to account for operation of the camera metrology apparatus 100 in both a horizontal orientation and a vertical (e.g., upright) orientation or at any suitable angle there between. For example, in the vertical orientation (see FIGS. 8A-8D) the base section 102 is oriented substantially upright with the device under test 111, held by a predetermined device under test mount interface of a device under test mount 140 mount, oriented with a camera sensor 300 of the device under test 111 in a substantially horizontal orientation. In the horizontal orientation (see FIGS. 2A-2C and 4A-4C), the base section 102 is oriented substantially horizontally with the device under test 111, held by the predetermined camera mount interface of the camera mount 140, oriented with the camera sensor 300 of the device under test 111 in a substantially vertical orientation. The vertical orientation may facilitate a smaller footprint (e.g., occupies less floor space compared to the horizontal orientation) and provide for serial placement of multiple cameral metrology apparatus 100 in rows and/or columns arrangement within a fabrication or testing facility. In other aspects, the camera metrology apparatus 100 may be operated in any suitable plane that lies between a horizontal plane and a vertical plane.

The base section 102 is illustrated in the Figures as being fixed but, in other aspects the base may be movable (e.g., the base may be rotatable in the θ direction about the Y axis and/or be movable linearly along the Y axis, with respect to the global reference frame which is based on the drive section housing defining the Y axis (θ direction rotation)). If the base is movable, the drive section housing (such as a housing of the θ drive motor 107) may form or otherwise define a seating surface or base on which the base section 102 is mounted. The base section 102 at least in part defines an azimuth stage of the actuation platform 167 as described herein.

The base section 102 includes a mounting surface 270. The mounting surface 270 includes different predetermined mounting stations 200-206 (also described below) at predetermined locations on the mounting surface 270. The different predetermined mounting stations 200-206 include controlled couplings 600 that have deterministic coupling features 601, 603 (or 602, 604 see FIG. 6A), such as kinematic couplings, that provide for the repeatable deterministic coupling of the at least one device under test mount 140 and at least one accessory device mount (e.g., such as the projector roll assembly 150 and mounting devices 141) to the base section 102. The controlled coupling 600 are position deterministic to positionally fix the at least one device under test mount 140 and at least one accessory device mount in space. In other aspects, the controlled coupling may be a relaxed kinematic coupling that may have a relaxed pose determination to allow limited freedom of movement in a linear traverse direction or rotation about a predetermined reference axis. The different predetermined mounting stations 200-206 also include any suitable power interface (e.g., plugs, socket, etc.), such as for example suitable for CAN bus control architecture. Each of the predetermined mounting stations 200-206 may have a unique identification registered with the controller 190, where the controller 190 may be programmed with positional data for the different accessory devices 110 and/or devices under test 111 for the different predetermined locations of the different predetermined mounting stations 200-206 with respect to the common configuration platform 101 (e.g., a θ position or other suitable positional information of each of the different predetermined mounting stations 200-206). Any suitable marking indicia 299 may also be provided each of the different predetermined mounting stations 200-206 so that a user of the camera metrology apparatus 100 can identify the different predetermined mounting stations 200-206 as those stations are identified in the controller 190.

As will be described below, the actuation platform 167 is operably coupled to at least one of the multiple independent drive axes so as to generate relative motion with more than one independent degrees of freedom between the predetermined device under test mount interface and the predetermined accessory device mount interface effecting metrology measurement of the device under test 111 with each of the more than one independent degrees of freedom. As an example, the drive section 105 includes multiple independent drive axes mounted to the base section 102. In one aspect, at least one of the more than one independent degrees of freedom of the actuation platform 167 effecting a metrology measurement is actuated by one of the multiple independent drive axes arranged so as to generate substantially infinite rotation. For example, at least one of the multiple independent drive axes has a drive shaft 280 including a slip ring power coupling 281. The drive section 105 has at least one drive axis that includes a harmonic drive 106HD, 107HD, 108HD, 109HD, where the at least one drive axis defines at least one of the more than one independent degrees of freedom of the actuation platform. For example, the drive section 105 includes a θ-drive motor 106, a Φ-drive motor 107, an X-drive motor 109, and a Z-drive motor 108 where one or more of these motors may be harmonic drives 106HD-109HD. In other aspects, any one or more of the actuable stages described herein may be manually operated or motorized, with the use of, for example, any suitable encoder 106E-109E.

The drive motors 106-109 may be any suitable motors including rotary brushless DC (direct current), rotary brushless AC (alternating current), etc. and may be of any suitable motor type (e.g., stepper motors, servo motors, rotary worm drives, etc.). Each of the drive motors 106-109 may have any suitable encoders 106E-109E, including but not limited to optical encoders, laser interferometers, etc. The encoders may provide one or more of absolute and incremental positioning of the respective drive motors and/or actuable stage of the camera metrology apparatus 100. The encoders, such as the absolute encoder, provides for positional recovery of the camera metrology apparatus 100 after a power loss, actuation of an emergency stop switch, and/or other stoppage event that results in the camera metrology apparatus 100 being placed in a "cold" start pose (e.g., a pose of the camera metrology apparatus 100 where the positional relationship between the actuation stages is not known). For example, referring to FIGS. 1A, 2A, 2D, 4A, 4D each drive motor 106-109 may have a home or zero position at which the rotational position of the drive shaft is known with respect to, for example, a fixed point on the motor stator. These home or zero positions of the drive motors 106-109 may orient, for example, respective ones of the accessory device (such as the target projectors 110P), the rotor 103, the turret 104 and the driven member 650 of the turret 104 in known locations relative to each other to facilitate programmed movement of the camera metrology device 100 for carrying out metrological testing (e.g., the programmed movements may be based on the home positions of the actuations stages). The absolute encoder of each of the drive motors 106-109 may be set so as to have a zero location that corresponds to the home location of the motor. As such, when there is a stoppage event that results in a cold start, the absolute encoders may be read by the controller 190 and the drive motors may be automatically actuated to return the respective actuation stages to the respective home or zero positions so that the camera metrology apparatus is ready for metrological testing substantially immediately upon startup. In other aspects, the absolute encoder may be read after a stoppage event that results in a cold start so that the positions of the actuation stages are determined (e.g., the controller self identifies the pose of actuation stages relative to the home positions) for continuing a metrological test that was in process at the time of the stoppage event.

The drive section 105 is illustrated in the Figures as having a modular configuration where one or more of the drive motors 106-109 is a drive module (e.g., a separate, independently mounted drive). The drive section, as described herein, provides two or three degrees of freedom (and in some aspects, four degrees of freedom) for driving the various stages (e.g., the azimuth stage, the elevation stage, the projector roll stage, and in some aspects, the Z stage) of the actuation platform.

Each of the drive motors 106-109 may be coupled to the controller 190 in any suitable manner, such as through the CAN bus (or other suitable control communication architecture), for receiving control commands to effect movements of the different portions of the camera metrology apparatus 100 as described herein.

The azimuth stage includes the θ-drive motor 106 and the rotor 103. The θ-drive motor 106 drives rotation of the rotor 103. In other aspects the θ-drive motor 106 may drive rotation of the base 102 if the base is movable as described herein. The casing 106C of the θ-drive motor 106 may be mounted to the base section 102 in any suitable manner for driving a drive shaft 280 (FIG. 2B) where the axis of rotation of the drive shaft 280 is coincident with the Y axis. In other aspects, such as where the base 102 is movable, the casing 106C of the θ-drive motor 106 may be mounted to any suitable surface and where the casing 106C forms (or an output of the motor, such as when a harmonic drive) a seating surface for the base 102. In one aspect a slip ring power coupling 281 may be provided on the drive shaft 280 for providing power to the actuation platform 167 and the accessory devices 110 and/or devices under test 110 mounted thereto. The slip ring power coupling 280 may also provide for substantially infinite rotation of the rotor 103 about the Y axis. In one aspect, the θ-drive motor 106 is the harmonic drive 106HD, where the output of the harmonic drive 106HD is coupled to the rotor 103 and has any suitable speed reduction. Inclusion of the harmonic drive 106HD in the azimuth stage provides the azimuth stage with unimpaired operation both in the horizontal orientation (e.g., with rotation of the rotor 103 about the Y axis in a horizontal plane) and vertical orientation (e.g., with rotation the rotor 103 about the Y axis in a vertical plane) of the camera metrology apparatus 100.

The elevation stage includes the turret 104 and the Φ-drive motor 107. The Φ-drive motor 107 drives rotation, such as through a drive shaft, of a driven member 650 of the turret 104. The Φ-drive motor 107 may be mounted to the turret 104 in any suitable manner. In one aspect, the Φ-drive motor 107 is mounted to the turret so as to be enclosed within a casing 104C of the turret. In one aspect, the Φ-drive motor 107 is the harmonic drive 107HD, where the output of the harmonic drive 107HD is coupled to or forms the driven member 650 and has any suitable speed reduction. Inclusion of the harmonic drive 107HD in the elevation stage provides the elevation stage with unimpaired operation both in the horizontal orientation and vertical orientation of the camera metrology apparatus 100. Here, the actuation platform 167 has two degrees of freedom driven by two independent drive axes of the drive section 105, where each of the two independent drive axes have a harmonic drive which may provide for operation of the camera metrology apparatus 100 in both vertical (e.g., upright) and horizontal orientations.

Figure 6A:
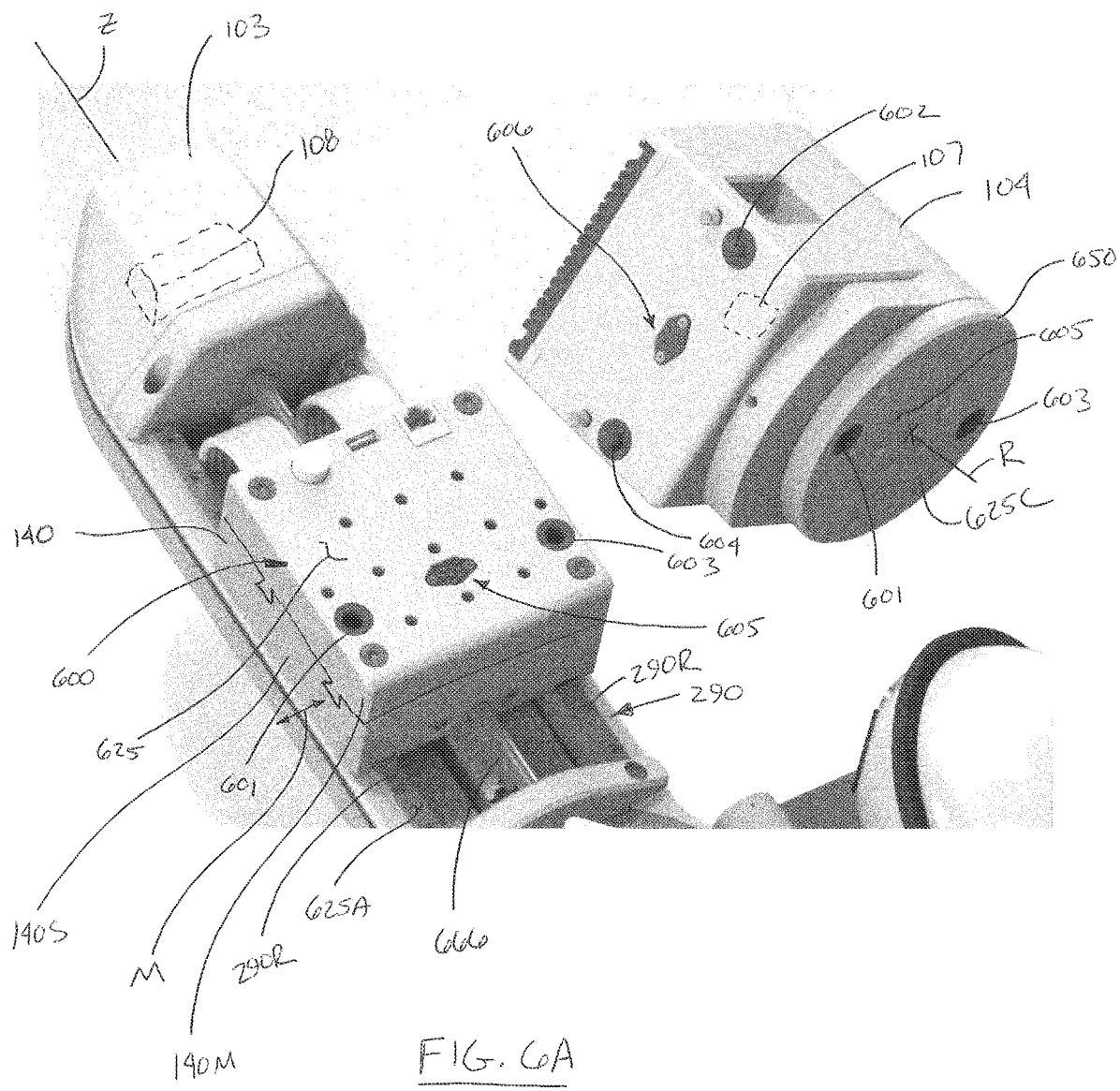
FIG. 6A is a perspective illustration of a portion of the camera metrology apparatus of FIG. 1 in accordance with aspects of the present disclosure.

The turret 104 (and elevation stage at least partially defined thereby) is coupled/mounted to the azimuth stage in any suitable manner. For example, in one aspect and referring also to FIGS. 6A and 6B, the rotor 103 includes a shuttle 140 that forms a seating surface 625 for the elevation stage. The seating surface 625 defines a datum that is controlled in a known location with respect to the Y axis of the azimuth stage. In one aspect, the elevation stage may have two degrees of freedom (e.g., rotation about the R axis and linear movement in the Z direction), while in other aspects the elevation stage may have one degree of freedom (e.g., rotation about the R axis). In still other aspects, the elevation stage may have three degrees of freedom (e.g., rotation about the R axis, linear movement in the Z direction, and linear movement in the M direction—see FIG. 6A). In yet other aspects, the elevation stage may have two degrees of freedom (e.g., rotation about the R axis and linear movement in the M direction—see FIG. 6B).

Where the elevation stage has two degrees of freedom (as illustrated in FIG. 6A) the rotor 103 may include a Z-axis stage that includes a prismatic joint 290 and a shuttle 140 that is movably mounted to the prismatic joint 290 so that the shuttle 140 is movable along the rotor 103 in the Z-direction. The prismatic joint 290 provides for controlled and repeatable traverse (relative to the Y axis) of the shuttle 140 in the Z direction. The seating surface 625 may also include controlled coupling 600 (described below in greater detail) which forms a datum for controllably and repeatably locating the turret 104 on the shuttle 140 so that, e.g., the driven member 650 is controlled in a known location with respect to the Y axis. In some aspects, the shuttle 140 and turret 104 may be formed as an integral unit (as illustrated in FIGS. 2B, 2C, 4B, 4C). Where the shuttle 140 is integral to the turret 104 the prismatic joint 290 may form the seating surface 625A, that is substantially similar to seating surface 625, that defines a datum that is controlled in a known location with respect to the Y axis of the azimuth stage. The shuttle 140 may include any suitable locking mechanism (that engages the prismatic joint 290 or the rotor 103) to lock the position of the shuttle 140 in the Z-direction relative to the Y axis or other devices mounted to the base section 102. In one aspect, referring to FIGS. 6A and 6B, the shuttle 140 may include a base portion 140S and a movable portion 140M that is movably coupled to the base portion 140S in any suitable manner, such as with a prismatic joint. Any suitable motor (similar to any one of the motors described herein) and encoders (similar to any one of the encoders described herein) may be provided in one or more of the base portion 140A and movable portion 140M so that the movable portion 140M traverses along the M axis. The M axis may be transverse or orthogonal to the Z axis and be disposed in a plane that is substantially perpendicular to the Y axis. In other aspects, the movable portion 140M may be manually positioned along the M axis with or without the use of encoders.

In one aspect, the movement of the shuttle 140 in the Z-direction along the prismatic joint 290 is manually operated. Where movement of the shuttle 140 is manually operated, the rotor may be provided with any suitable measured graduations, hard stops, or other locating devices/aids for positioning the shuttle 140 in the Z-direction (and devices mounted thereto) relative to the Y axis or any devices under test 111 or accessory devices 110 mounted to the base section 102. In other aspects, a Z-drive motor 108 may be provided for automated movement of the shuttle 140 along the prismatic joint 290 in the Z-direction. The Z-drive motor 108 is illustrated as a motor module that is separate from the motor module formed by the Φ-drive motor 107 however, in other aspects the Z-drive motor 108 and the Φ-drive motor 107 may be an integral unit. The Z-drive motor 108 may be coupled with a lead screw drive 666 (or any other suitable screw drive such as a ball screw drive) for driving the shuttle 140 along the prismatic joint 290 in the Z direction. Where the Z-drive is manually operated a guide rod may be positioned on the Z-axis stage where the screw of the screw drive is located for providing additional guidance/alignment for the Z-direction traverse of the shuttle 140.

Figure 6B:
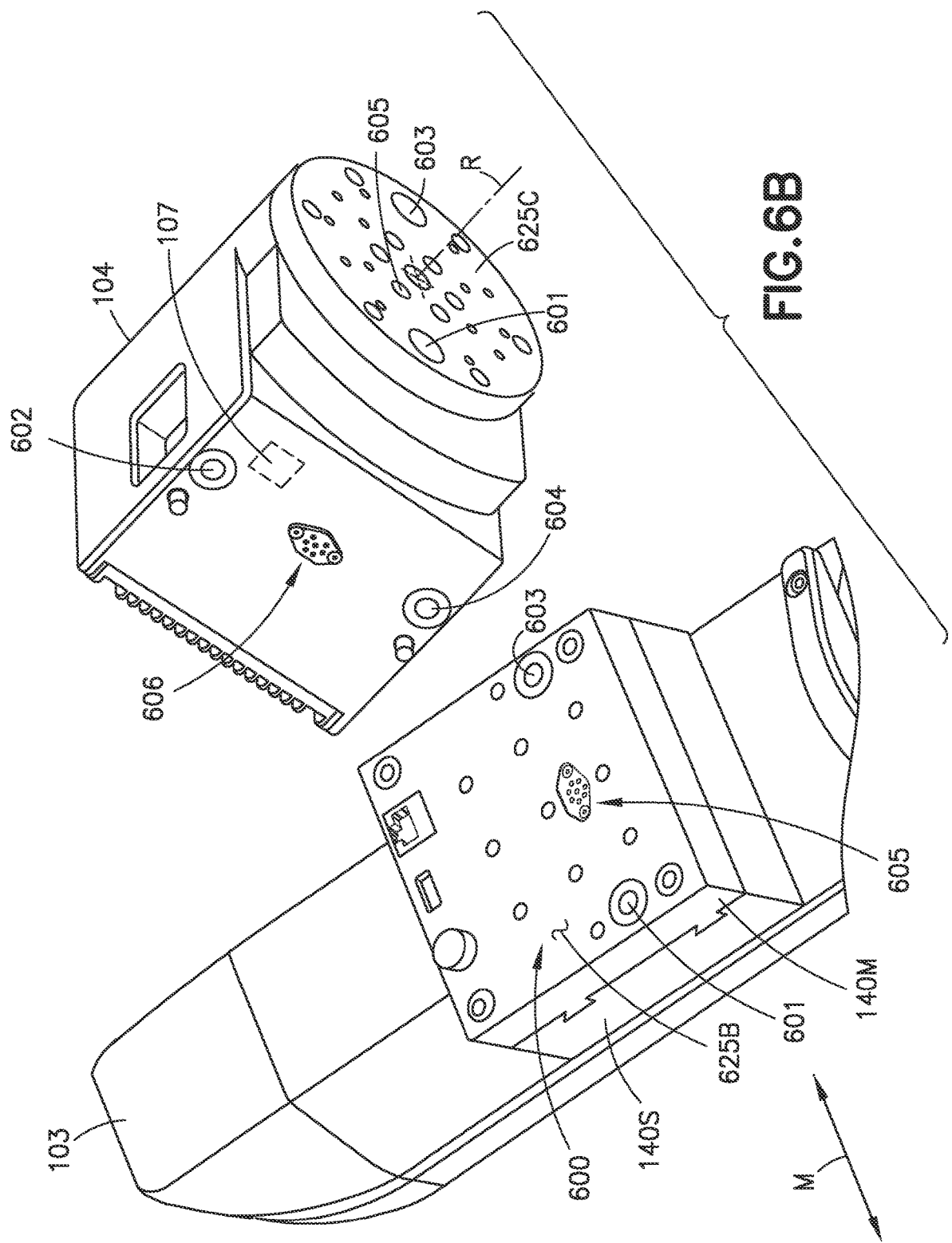
FIG. 6B is a perspective illustration of a portion of the camera metrology apparatus of FIG. 1 in accordance with aspects of the present disclosure.

Any suitable encoder 108E (FIG. 1A) may be provided so that a position of the shuttle 140 and/or a position of the datum formed by controlled coupling 600 (such as by kinematic couplings 601, 603) is in a known and calibrated position relative to the Y axis of the azimuth stage. The encoder may be provided along the Z axis of travel or on the rotational axis of the Z-drive motor 108.

Where the elevation stage includes one degree of freedom (e.g., the R-axis degree of freedom as illustrated in FIG. 6B), the rotor 103 may include seating surface 625B (substantially similar to seating surface 625) that is fixedly positioned on the rotor in a known location with respect to the Y axis of the azimuth stage where the turret is coupled to the seating surface 625B with the controlled coupling 600.

While the aspects of the present disclosure are described as having the azimuth stage coupled to the base section, the Z stage coupled to the azimuth stage, the elevation stage coupled to the Z stage (or to the azimuth stage), etc., each of these actuable stages may be considered modules that can be stacked, in any order, in series or parallel, or in any combination thereof, to form an N×M axis optomechatronic network. The modules are scalable in a quantized fashion such that the modules may be used to achieve any desired optomechatronic functionality and a desired scale. The level of quantization of the scale may be particular to a desired application. It is also within the scope of the present disclosure that adapter modules be utilized to couple across scales, where the adapters provide or do not provide additional motion (degrees of freedom) to the camera metrology test apparatus 100. Each of the modules of the camera metrology test apparatus 100 may also be characterized, qualified, and supplied with a Optomechatronic Transfer Function (OMTF) black-box physical plant model that may be used for systematic analytical physical modeling of the OMTF N×M axis network. The black-box physical plant model may be a computer numerical physics model in the form of dynamic link library (DLL), COM, or any other suitable object oriented software method, function, of application, that fully describes the physical response of the system it represents. This model can include any one or more of, but is not limited to, mechanical kinematics and dynamics (e.g., linear responses such as physical degrees of freedom, natural frequencies, etc.), electrical responses (e.g., equivalents to the above mechanical dynamics, including transmission line models, radio frequency, etc.), and optical responses (equivalent to the above mechanical dynamics and electrical responses, including photon, electron, and X-ray optics).

Figure 2B:
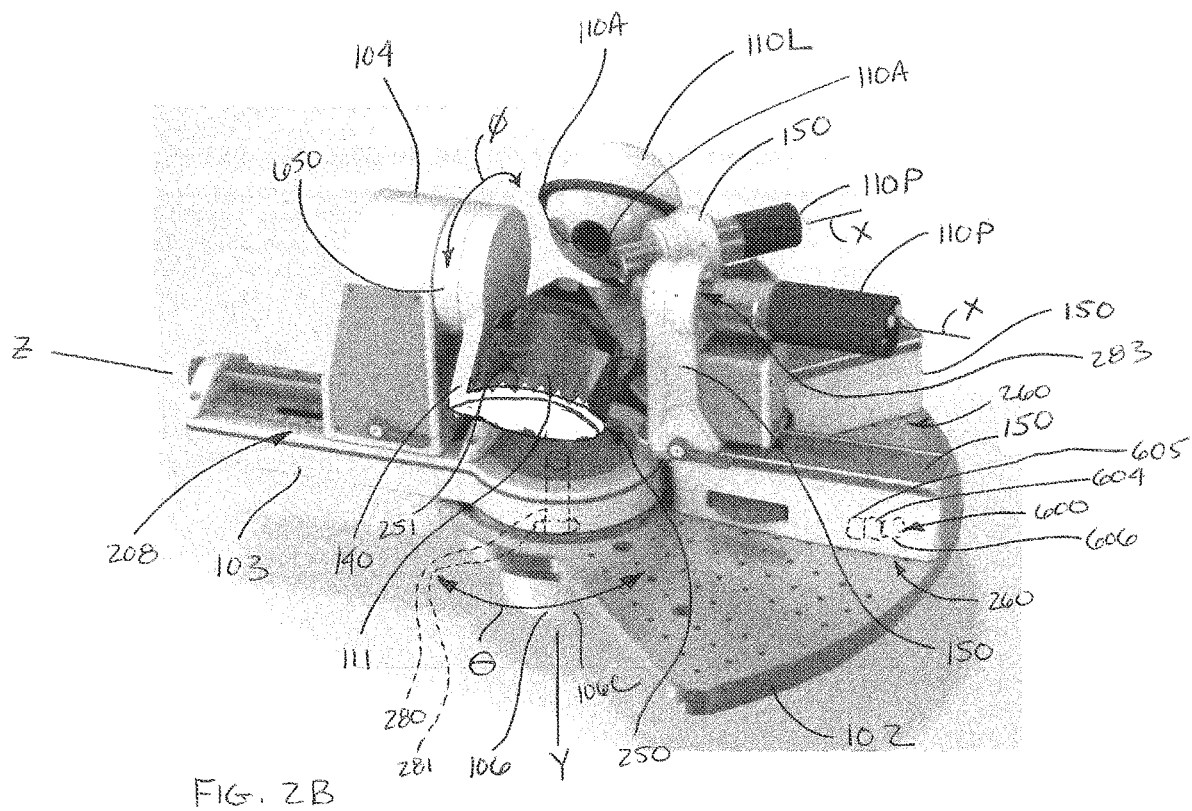
Figure 2C:
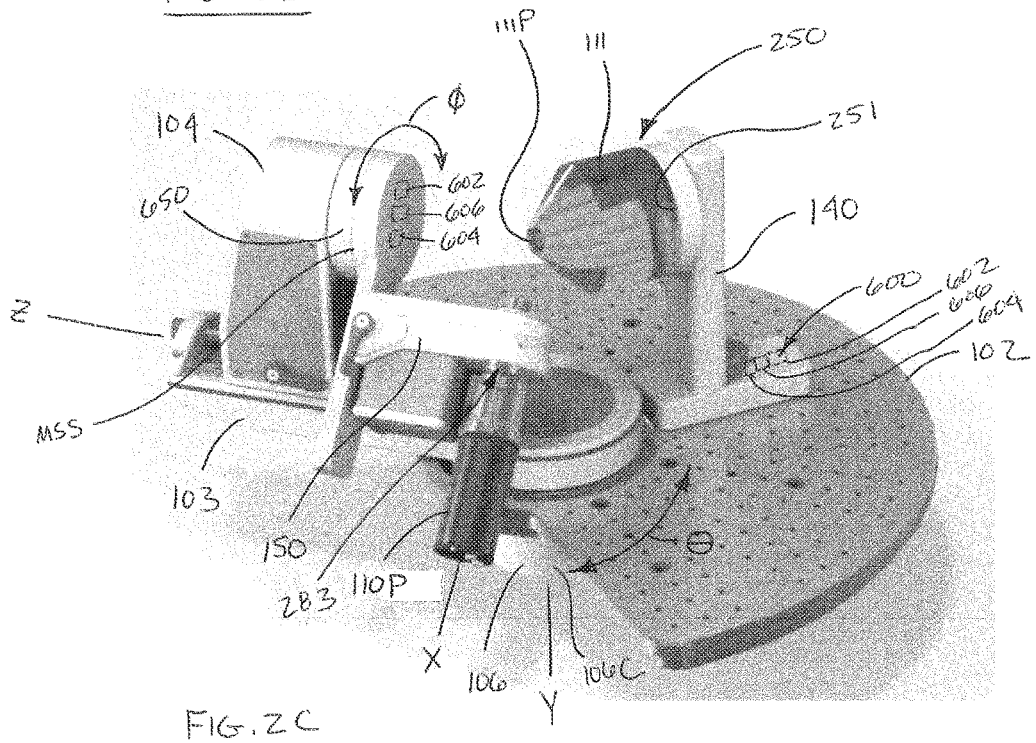
Figure 2D:
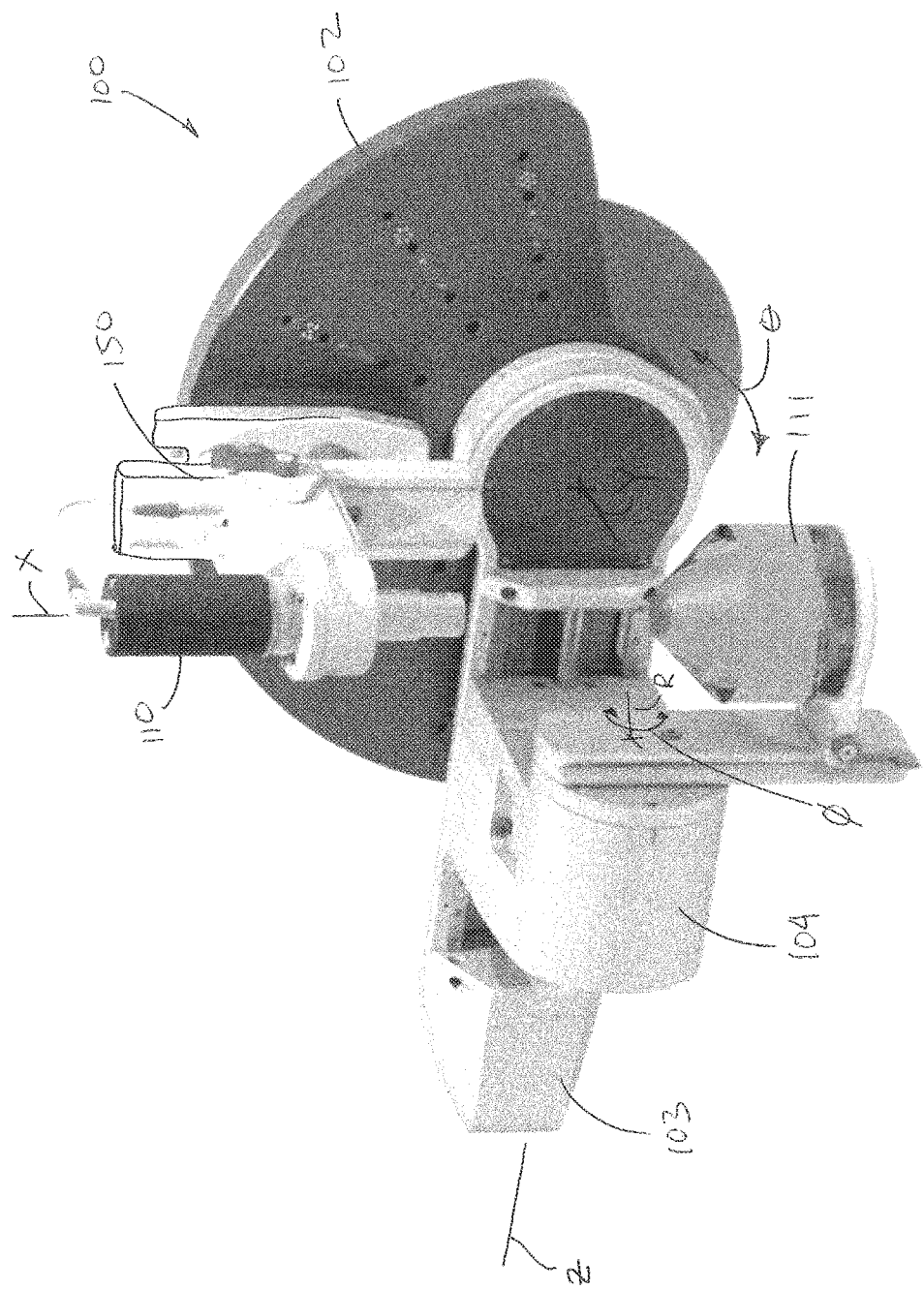

Referring to FIGS. 1B and 2B, control commands (or data transfer) from the controller 190 and power from the power supply 120 to the elevation stage (to provide data communication and/or power the Φ-drive motor 107, the a Z-drive motor 108 when equipped, an accessory device 110 mounted to the elevation stage, and/or a device under test 111 mounted to the elevation stage) is routed or fed, in one aspect, through the azimuth drive shaft 280 to the rotor 103. As noted herein a slip ring power coupling 281 is provided on the drive shaft 280 to provide substantially infinite (e.g., greater than 360°) rotation to the rotor 103 about the Y axis for unrestricted rotation of the θ drive motor 106 output. In one aspect, the encoder 106E (FIG. 1A) provides both absolute and incremental pose of the rotor 103 about the Y axis. In one aspect a slip ring power coupling (similar to slip ring power coupling 281) may be provided on a drive shaft of the Φ-drive motor 107 for providing power to the accessory devices 110 and/or devices under test 110 mounted thereto. The slip ring power coupling 280 may also provide for substantially infinite rotation of the driven member 650 about the R axis.

Referring again to FIGS. 1A, 1B, 2A-2C, and 4A-4C, the actuation platform 167 includes the azimuth stage, the elevation stage, and where equipped the Z stage. The rotor 103 of the azimuth stage is coupled to the azimuth drive module (e.g., the θ-drive motor 106) for rotation about the Y axis. The azimuth stage forms a controllable seating surface (see, e.g., seating surfaces 625, 625A, 625B in FIGS. 6A and 6B) for the elevation drive module (e.g., the Φ-drive motor 107) and/or the Z-drive module (where the Z-drive stage forms a module that is separate from and may be mounted to the rotor 103 or be integral to the rotor 103). The azimuth stage, such as with the rotor 103, forms a controllable seating surface (see, e.g., seating surfaces 625, 625A, 625B in FIGS. 6A and 6B) for the elevation stage (that may depend from the elevation drive module or the elevation drive module may be integral to the elevation stage).

As described herein, the azimuth stage rotates in the θ direction relative to the base section 102, that includes the different predetermined mounting stations 200-206 disposed on the base section mounting surface 270. The azimuth stage defines the relative rotation between the device under test 111 and the accessory devices 110, one of which is mounted to the stationary base section 102 and the other of which is mounted to and moves with the azimuth stage, so as to effect azimuth sweep of the accessory device 110 on the camera sensor 300 as illustrated in FIGS. 3 and 5.

The elevation stage depends from the elevation drive module (e.g., the motor module formed by Φ-drive motor 107) or elevation drive module is integral with the elevation stage. The elevation drive module/stage is coupled to the azimuth stage (in other aspects, such as where the mounting surface is movable by the azimuth drive, the elevation drive module/stage may be coupled or dependent from the azimuth drive module casing). In the aspects illustrated in FIGS. 2A-2C, 4A-4C, and 6A the elevation stage is seated on the seating surface 625 of the shuttle 140 of the Z stage, while in the aspect illustrated in FIG. 6B, the elevation stage is seated on the seating surface 625B of the rotor 103. The seating surface 625 is defined by the shuttle 140 which is driven by the screw drive 666 and rides along the prismatic joint 290 (such as on deterministic rails 290R or other deterministic linear bearings). The seating surface 625 and the seating surface 625B are in controlled known locations (controlled in alignment of the X, Y, θ, and Φ axes) with respect to the different predetermined mounting stations 200-206 on the base section 103, the azimuth rotation axis Y, the calibration of the Z stage (where equipped) or a fixed Z datum for locating the elevation drive module/stage relative to the X, Y, θ, and Z axes). This provides for a known repeatable location of the device under test mount interface 250 and the stimulation source mount interface 283 with respect to each other for each different predetermined mounting station 200-208 location. The known repeatable location of the device under test mount interface 250 and the stimulation source mount interface 283 further provides predetermined repeatable location of the device under test 111 entry pupil 111P with respect to an output aperture 110A of the accessory device 110.

Where the device under test 111 or an accessory device 110 (such as projector 110P) is to be moved during testing, the device under test 111 or the accessory device 110 may be mounted, in any suitable manner, to the turret 104. In one aspect, any suitable device under test mount 140 may be coupled to the driven member 650, such as with controlled coupling 600, for mounting the device under test 111 to the turret 104. In other aspects, any suitable accessory device mount (e.g., such as the projector roll assembly 150 and mounting devices 141) may be coupled to the driven member 650, such as with controlled coupling 600, for mounting the accessory device 110 to the turret 104. In one aspect, as illustrated in FIGS. 2B, 2C, 4B, 4C, the shuttle 140 and the turret 104 may be configured as a single integrated unit.

As described herein, the shuttle 140 (or the rotor 103) includes an interface defined by the seating surface 625, 625B such that the interface includes the deterministic controlled couplings 600 (FIG. 6A) that mate with the elevation stage (e.g., the elevation stage has a reciprocal interface with corresponding controlled couplings 600 (e.g., couplings 602, 604, 606). The deterministic controlled couplings 600 provide for the repeatable positioning of the elevation drive module/stage relative to, e.g., the X, Y, 6, and Z axes. With reference to FIG. 6A, the controlled couplings 600 include both mechanical couplings 601-604 (such as kinematic couplings) and controller couplings 605, 606 that automatically register the elevation stage (and in some aspects the device under test 111 and/or the accessory device 110 coupled thereto) in a plug and play manner with the controller 190 through, for example, the controller area network (CAN) bus (illustrated in FIG. 1B). For example, controller 190 is communicably connected to shuttle 140 or rotor 103 so as to automatically register coupling of the elevation stage (and in some aspects the device under test 111 and/or the accessory device 110 coupled thereto), and select the at least one of the more than one different predetermined platform configurations of the common configurable platform 101. The controller couplings 605, 606 may be configured for data transfer to and from the controller 190 as well as power transfer from the power supply 120 for providing data communication and power to the device under test 111 or accessory device 110 mounted to the elevation platform. In one aspect, the power from the power supply 120 may only be provided to the mounting stations 200-208 when a device is coupled to the respective mounting station 200-208.

The elevation stage has a deterministic coupling surface 625C (see FIGS. 6A and 6B) that forms an interface for repeatably mounting a device under test 111 or accessory device 110 to the elevation stage. For example, the driven member 650 of the turret 104 includes the deterministic coupling surface 625C that orients the pose of the device under test 111 in roll motion about the R axis of the Φ-drive motor 107 module. The deterministic coupling surface 625C also orients the pose of the accessory device 110 (such as, e.g., the focusing target projector 110FTP or any other suitable accessory device) in roll motion about the R axis of the Φ-drive motor 107 module. The Φ-drive motor 107 module defines an independent degree of freedom about the R axis between the device under test 111 and the accessory device 110 with one of the device under test 111 and the accessory device 110 mounted to the base section 102 and the other mounted to the elevations stage to provide roll sweep across the camera sensor 300 as illustrated in FIG. 5 (where the camera metrology apparatus 100 is in a spherical polar configuration).

The deterministic coupling surface 625C of the driven member 650 of the turret 104 orients the pose of the device under test 111 in elevation motion about the R axis of the Φ-drive motor 107 module. The deterministic coupling surface 625C also orients the pose of the accessory device 110 (such as, e.g., the focusing target projector 110FTP or any other suitable accessory device) in elevation motion about the R axis of the Φ-drive motor 107 module. The Φ-drive motor 107 module also defines an independent degree of freedom about the R axis between the device under test 111 and the accessory device 110 with one of the device under test 111 and the accessory device 110 mounted to the base section 102 and the other mounted to the elevations stage to provide elevation sweep across the camera sensor 300 as illustrated in FIG. 3 (where the camera metrology apparatus 100 is in a Cartesian configuration).

As described herein, the common configurable platform 101 has a freely selectable/configurable and reconfigurable architecture. For example, the common configurable platform 101 includes different predetermined mounting stations 200-208 on both the base section 102 and the actuation platform 167 (such as on the different actuation stages described herein) where the characteristics (e.g., location, orientation, etc.) of each of the different predetermined mounting stations 200-208 is known to the controller 190. As noted above, the base section 102 has more than one predetermined mounting stations 200-206 thereon for at least one of the at least one device under test mount 140 and the at least one stimulation source mount (e.g., such as the projector roll assembly 150 and mounting devices 141), wherein coupling of the at least one of the predetermined device under test mount 140 and the predetermined stimulation source mount interface with each of the more than one predetermined mounting stations 200-206, of the base section 102, effects selection of at least one of the more than one different predetermined platform configurations. The azimuth stage includes the predetermined mounting interface 208 for coupling of the elevation stage and the elevation stage includes predetermined mounting interface 207 for coupling of at least one of the at least one device under test mount 140 and the at least one stimulation source mount (e.g., such as the projector roll assembly 150 and mounting devices 141). The at least one device under test mount 140 and the at least one stimulation source mount are arranged so as to define different repeatable relative positions between a predetermined device under test mount interface 250 and a predetermined stimulation source mount interface 283, each for a respective one of the different predetermined platform configurations and different predetermined metrology measurement characteristic corresponding thereto.

At least one of the at least one device under test mount 140 and the at least one stimulation source mount is configured so as to be mounted in different predetermined mounting stations 200-206 on the base section 102 or the predetermined mounting station 207 on the elevation stage (e.g., to the driven member 650 of the turret 104), and wherein at least one of the more than one different predetermined platform configurations is defined by the at least one of the at least one device under test mount 140 and the at least one stimulation source mount mounted in at least one of the different predetermined mounting stations 200-206, 107 on the base section 102 and/or the elevation stage. In one aspect, the predetermined stimulation source mount comprises different interchangeable stimulation source mounts, each configured so as to be interchangeably mounted to an actuable stage (e.g., such as the elevation stage or any other suitable stage) of the actuation platform 167 or the base section 102, and with a different interface conforming to a different respective device under test stimulation source effecting a different corresponding camera stimulation characteristic.

The at least one accessory device (e.g., camera stimulation sources) mount (e.g., such as the projector roll assembly 150 and mounting devices 141) and the at least one device under test mount 140 are interchangeably mounted to the different predetermined mounting stations 200-208. In one aspect, at least one of the at least one device under test mount 140 and the at least one accessory device mount is configured so as to be mounted in the different predetermined mounting locations/stations 200-208 on an actuation stage (such as the turret 104) of the actuation platform 167. The actuation platform 167 has a selectable configuration freely selectable between more than one different predetermined platform configurations, each with a different predetermined mounting location characteristic changing a predetermined mounting location relative to the actuation platform 167 of at least one of predetermined device under test mount interface 250 (see, e.g., FIGS. 2A, 2B, 2C) and a stimulation source mount interface 260 (see FIGS. 2B and 4B) and effecting a different predetermined metrology measurement characteristic. The at least one device under test mount 140 and the at least one accessory device mount are arranged so as to define a repeatable relative position between the predetermined device under test mount interface 250 and the predetermined accessory device mount interface 260 in each of the different platform configurations and effect free selection between each different predetermined platform configuration.

Referring to FIGS. 2A, 2C, 4B, 4C and 6A, each of the different accessory device (e.g., camera stimulation sources) mount (e.g., such as the projector roll assembly 150 and mounting devices 141) and the at least one device under test mount 140 include controlled couplings 600 that mate with corresponding controlled couplings 600 of each different predetermined mounting station 200-207. With reference to FIG. 6A, the controlled couplings 600 include both mechanical couplings 601-604 (such as kinematic couplings) and controller couplings 605, 606 that automatically register (e.g., convey an identification of the respective mount) the respective mount with the controller 190 in a plug and play manner with the controller 190 through, for example, a controller area network (CAN) bus (illustrated in FIG. 1B). In one aspect, controlled couplings 600 may also register the accessory devices 110 (coupled to or integral with the different accessory device mounts) and/or the device under test (mounted to a respective device under test mount 140) with the controller 180 and enable automatic plug and play with the controller 190 through, for example, the controller area network (CAN) bus. The interfaces of the respective mounts for the accessory devices 110 and the devices under test 111 form deterministic controlled interfaces for the respective accessory devices 110 and devices under test 111 and define interface position datums for calibration of the respective accessory devices interfaces 283 and the device under test interfaces 250 of the mounts; which once calibrated provide for freely swapping (with limited or no in situ recalibration on swapping) the mounts between one or more of the mounting station 200-206 locations on the base section 102, between the mounting station 200-206 locations 206 of the base and the mounting station location 207 of the elevation stage, between accessory devices/devices under test at the same mounting station 200-207, between accessory devices/devices under test at a common mount, and between elevation interface poses.

Still referring to FIGS. 1A, 1B, 2A-2C, and 4A-4C, the camera metrology apparatus also includes one or more device under test mount 140 that couples the device under test 111 to the base 102 or the actuation platform 167. The device under test mount 140 also includes the controlled couplings 600 (see FIG. 6A) as described above to, for example, provide power, control command, and data transfer interfaces between the device under test 111 and the controller 190. Further, the device under test mount 140 includes a predetermined controlled interface 250 (see, e.g., FIGS. 2A, 2B, 2C) for the device under test 111 that forms a seating surface 251 that positions the entry pupil 111P (see, e.g., FIGS. 2A, 2C, 4A, and 4C) in a predetermined position relative to a mount to mounting coupling reference frame. As an example, the seating surface 251 positions the entry pupil 111P coincident with (e.g., over the centers of rotation of) the axes of rotation Y and R of the common configurable platform 101. For example, the entry pupil 111P may be located substantially at the intersection of the Y and R axes. The device under test mounts 140 may be swapped (substituted one for another) in a substantially one step coupling/decoupling to swap the device under test 111 with another device under test 111 to a known repeatable position (e.g., such as placing the entry pupil 111P substantially at the intersection of the Y and R axes).

The controlled couplings 600, such as the mechanical couplings 602, 604 and the controller couplings 606 of the accessory device mount and the device under test mount 140 are located on respective mount seating surfaces MSS. The mount seating surface MSS and the surface to which it is coupled (e.g., the deterministic mounting surface 270 of the base section 102 or the deterministic coupling surface 625C of the elevation stage turret 104) form a controlled interface corresponding to the different accessory devices (e.g., target projectors 110P, illuminators 110L, etc.). In the case of the projectors 110P, the seating surface MSS sets a position of the projector lens and a projection axis (e.g., the set the projected target location on the camera sensor 300) in a known and predetermined position with respect to the mounting coupling of the deterministic mounting surface 270 of the base section 102 or the deterministic coupling surface 625C of the elevation stage turret 104 and the device under test 111. In the case of other peripheral accessory devices, such as illuminators 110L the seating surface MSS sets a position of the illumination projection axis in a known and predetermined position with respect to the mounting coupling of the deterministic mounting surface 270 of the base section 102 or the deterministic coupling surface 625C of the elevation stage turret 104 and the device under test 111. In the case of the device under test 111, the seating surface MSS sets a pose of the device under test 111 (which may include a position of the entry pupil 111P) in a known and predetermined position with respect to the mounting coupling of the deterministic mounting surface 270 of the base section 102 or the deterministic coupling surface 625C of the elevation stage turret 104 and the accessory devices 110.

Mounting of the accessory devices 110 and devices under test 111 at the interfaces formed by the respective seating surfaces MSS and a respective one of the deterministic mounting surface 270 of the base section 102 or the deterministic coupling surface 625C of the elevation stage turret 104 and the device under test 111 results in known repeatable positions of the accessory devices 110 and the devices under test 111 with respect to the mount couplings 600. This provides for the swapping (e.g., exchanging one for another, without calibration, in a one-step coupling or decoupling to a known position on the base section 102 or the elevation stage) one accessory device mount (e.g., such as the projector roll assembly 150 and mounting devices 141) with another accessory device mount, swapping one device under test mount 140 with another device under test mount 140, and/or swapping an accessory device mount with a device under test mount 140.

The interfaces for each of the accessory device (e.g., camera stimulation sources) mount (e.g., such as the projector roll assembly 150 and mounting devices 141) and the at least one device under test mount 140 are calibrated (e.g., bore-sighted and positioned angularly in pitch and yaw) for each mounting station 200-207 on the actuation platform 167 (e.g., calibrated for the mounting stations of the base section 102 and the elevation stage). The calibration of the different accessory device mounts and the different device under test mounts 140 at each mounting station 200-207 may be stored in any suitable manner in the controller 190, such as in a look-up table (the look-up table may correlate calibration factors with an identification of each of the different predetermined (device under test and accessory) mounts and with the identification of the mounting stations 200-207 to, e.g., enable plug and play operability). Calibration factors stored in the look-up table may include target image position (e.g., roll/elevation and azimuth positions) for true target positons during device under test 111 testing. For example, the calibrated or known pose of the accessory device mount and device under test mount 140 interfaces employed respectively to calibrate the device under test 111 (of a known imaging sensor/camera calibration). The calibrated or known pose of the accessory device mount and device under test mount 140 interfaces may also be employed respectively for target projection which may establish the bolt-down bore-sighting. For example, a calibration mirror mounted to the device under test interface (e.g., the mirror is mounted to the device under test mount 140) and the target projector (with a calibration target) is mounted in the accessory device mount at the accessory interface to locate the calibration target in the calibration mirror. Once the calibration target is properly located in the calibration mirror, accessory devices and devices under test may be positioned in the calibrated mounts without further calibration of the accessory devices and devices under test.

Referring to FIGS. 1A and 1B, the controller is coupled to each of the actuable stages of the camera metrology apparatus 100. The controller 190 may be ganged controller having control modules that are communicably coupled to each other through, for example, the CAN bus architecture. The control modules may include one or more of a base section controller 190A, an azimuth stage controller 190B, an elevation stage controller 190D, a Z-stage controller 190E, a projector roll assembly controller 190C, a computer 190F, and a hand held controller 190G. The controller 190 is communicably connected to at least one of the more than one predetermined mounting stations 200-208 of the base section 102 so as to automatically register coupling of at least one of the device under test mount 140 and the at least one stimulation source mount to at least one of the more than one predetermined mounting station 200-206, and select the at least one of the more than one different predetermined platform configurations of the common configurable platform 101.

The controller 190, as described herein, is programmed to know (e.g., through the calibration of the various components of the camera metrology apparatus 100) the position of the mounting station 200-206 locations on the base section 102 with respect to the orientation of the azimuth rotation axis Y and the motor 106 position (e.g., with respect to the rotor 103 of the azimuth stage). The controller 190 is also programmed to know (e.g., through the calibration of the various components of the camera metrology apparatus 100) the position of the mounting station 207, 208 locations with respect to the elevation stage (e.g., the position of the elevation stage along the Z-axis and the location and orientation of the mounting station 207 on the turret 104). The controller also knows the device under test 111 and/or accessory device 110 characteristics mounted via the corresponding mount to the respective mounting station 200-207, as well as the characteristics of the elevation stage (e.g., the turret 104) mounted to mounting station 208.

The controller 190 is programmed with any suitable motion protocol for testing a device under test 111 mounted to one of the base section 102 or the actuation platform 167 with an accessory device(s) 110 mounted to the other one of the base section 102 (e.g., at one or more mounting locations 200-206) or the actuation platform 167. In another aspect, the controller 190 is programmed with any suitable motion control protocol for testing multiple devices under test 111 that are mounted to more than one mounting station 200-206 on the base section 102 with an accessory device 110 mounted to the actuation platform 167. One exemplary motion protocol would be for the controller to issue command signals for the rotation of the rotor 103 of the azimuth stage to align the device under test 110 mounted to (e.g., the turret 104) with a known mounting station location 200-206 of a desired accessory device 110 mounted to the base section 102 where the known locations of both the device under test 111 and the desired accessory device 110 are known from, for example, the calibration look-up table and the plug and play identification of the device under test mounts and the accessory mounts. The controller 190 knowing the locations of the mounting stations and operating under the motion protocols may generate a motion complete signal from the stage(s) being actuated (e.g., the motion complete signal may be generated by one or more of the an azimuth stage controller 190B, an elevation stage controller 190D, a Z-stage controller 190E, a projector roll assembly controller 190C) under the motion protocol (rather than call the stage position from the absolute and incremental encoder data to determine alignment between the station location and stage pose). In other aspects, encoder data may be used to verify positions of the actuated stage. A testing protocol may be commenced substantially immediately upon receipt of the motion complete signal. Here the separate motion (alignment) protocol and the test protocol decouple the device under test 111 testing from the stage motion control (e.g., the testing motion may be controlled from image data alone and position alignment is determined from the calibration described above). In other aspects, the mounting station locations 200-206 may be roughly known such that minor in-situ calibration of the accessory and device under test mounts may be performed in any suitable manner, such as with any suitable calibration tool. In this aspect, even though the mounting station locations 200-206 are roughly known, the controller 190 may still know which device is being coupled to the station locations 200-206, such as by suitable configuration of the controller couplings 605, 606 or in any other suitable manner.

Referring now to FIGS. 4B, and 7A-7F, the focusing target projector 110FTP that in one aspect is a focusing target projector will be described. The focusing target projector incorporates a moving target to set or change apparent object distance, and to perform through-focus measurements at, e.g., infinity. The focusing target projector 110FTP includes an onboard memory 789 that stores calibration settings for the target (such as targets 301, 302 shown in FIGS. 3 and 5) and illuminator of the focusing target projector 110FTP. These calibration settings may be communicated to the controller 190 upon connection of the focusing target projector 110FTP to the controller 190 in a plug and play manner (as described above). The focusing target projector 110FTP may be constructed of any suitable materials that provide for operation of the focusing target projector 110FTP through hundreds of thousands of cycles (e.g., such as about 400,000 cycles or greater). The focusing target projector(s) may be provided with any suitable focal length such as for example, 25 mm, 35 mm, 50 mm, 60 mm, 75 mm, 100 mm, 150 mm, 200 mm, or any other suitable focal length for performing tests on a device under test 111. As described previously, one or more of the different focusing target projectors 110FTP, each with a different focal length, may be mounted (with any suitable mount such as projector roll assembly 150) to one or more of the different mounting stations(s) 200-206 of the mounting surface 270, or to the station on the deterministic coupling surface 625C of the driven member 650.

As described above, the focusing target projector 110FTP includes the housing 700F that has a coupling surface 799 that interfaces with, for example, the projector roll assembly 150 for positionally aligning (e.g., in pitch and yaw) the focusing target projector 110P relative to the projector roll assembly 150 interface 260 as well as positionally aligning the focusing target projector 110P (e.g., in roll about the X axis) relative to, for example, a rotational home or zero position of the interface 283 about the X-axis. In one aspect, the projector roll assembly 150 is configured to provide linear position adjustment of the interface 283 and the projector 110P, such as the focusing target projector 110FTP along the X axis. For example, the projector roll assembly 150 includes a base member 150B (on which the coupling 600 is located) and a stanchion 150S. The base member 150B includes a prismatic joint 150PJ (e.g., such as rails, linear bearings, dovetail joint(s), etc.). The stanchion 150S is configured to mate with the prismatic joint 150PJ (e.g., includes one or more surfaces that are reciprocal to and mate with the prismatic joint) so that the stanchion is controllably movable along the prismatic joint 150PJ in the X direction. As described herein the controlled coupling 600 deterministically locates the, e.g., the base 150B, of the projector roller assembly 150 to a mounting station 200-207. The prismatic joint 150PJ is positioned on the base 150B in a known relationship with respect to, for example, mechanical (e.g., kinematic) couplings 602, 604 of the base 150B so that the positional orientation of the interface 283 (and the projector 110P mounted thereto) is controlled to a predetermined orientation with respect to the coupling 600. As described above, the position of the interface 283 (and the projector 110P mounted thereto) may be calibrated so as to be known by the controller 190 and to establish a known placement of the interface 283 and projector 110P mounted thereto. The base 150B may include any suitable locking mechanism 150K to lock the position of the stanchion 150S (and the interface 283 and projector 110P) relative to the coupling 600 at any suitable location along the prismatic joint 150PJ (e.g., in the X-direction) in a manner substantially similar to that described above with respect to the Z-axis stage.

The focusing target projector also includes a projector assembly 701, an illumination assembly 710, and a drive assembly 720. The projector assembly 701, the illumination assembly 710, and the drive assembly 720 may be housed within the housing 700F in any suitable manner. In one aspect, the housing 700F includes a projector portion 701P having the projector assembly 701. The projector assembly 701 may include predetermined lens and projector elements 701L mounted therein and defining a projection axis CX (e.g., that is substantially coincident with the X axis) and having a predetermined focal location (e.g., such as at infinity or other suitable focal location).

The illumination assembly 710 includes an illumination source 715 and object pattern or target 301, 302 illuminated by the illumination source 715 and disposed in a predetermined position relative to the projection axis of the projector assembly 701 so that an image of the illuminated object pattern projected through the projector assembly 701 out from an aperture AP of the housing 700F appears substantially at the predetermined position relative to the projection axis CX. In greater detail, the illumination assembly 710 includes a bushing 711, a bearing cage 712, and a piston 713 that form a telescoping assembly for moving the piston 713, within the bushing 711 in the X direction, any predetermined distance D. The bearing cage 712 includes ball bearings 712B and forms a preloaded bearing assembly that provides for movement of the piston 713 in the X direction substantially free from backlash.

Housed, at least partially within, the piston 713 is a target and diffuser assembly 714 (in which the object pattern or target 301, 302 is disposed), an illumination source 715, and a drive link assembly 716. The target and diffuser assembly 714 is mounted to a first end 713E1 of the piston 713. The illumination source 715 is mounted to the drive link assembly 716 at a second end of the piston 713E2. In one aspect, the inner wall(s) of the piston, between the illumination source 715 and the target and diffuser assembly 714 may be coated with a diffuse white coating to increase light transmission and improve the spatial uniformity of the illumination across the target 300, 301. The drive link assembly 716 is mounted to a second end 713E2 of the piston 713. The illumination assembly 710 may be mounted within the housing and bore-sighted (e.g., in roll, pitch, and yaw relative to the X axis) to the housing 700F (such as to the coupling surface 799) in any suitable manner such as by using lateral (front and rear) adjusters 770-773 and any suitable epoxy. In one aspect, the center of the target 301, 302 is bore-sighted to the coupling surface 799 to less than about 0.015° through a range of focus travel (see distance D in FIG. 7C) of the focusable target projector 110FTP.

The drive link assembly 716 of the piston 713 is coupled to the drive assembly 720 in any suitable manner as will be described below. The drive section 720 includes a drive axis (e.g., drive motor 750) that is operably coupled, by a coupling (as will be described below) within the housing 700F, to the illumination assembly 710 so as to move at least the illuminated object pattern or target 301, 302 relative to the predetermined focal location, of the projector assembly 701, in a direction of motion (e.g., along the X axis) aligned with the projection axis CX (which as noted above is coincident with the X axis) and in a range of motion D about the predetermined focal location. As will be described herein, the coupling between the drive axis and the illumination assembly 710 is configured so as to maintain the illuminated object pattern or target 301, 302 substantially steady in the predetermined position relative to the projection axis (e.g., the X axis) throughout the range of motion D.

In one aspect, the object pattern or target 301, 302 has a predetermined pattern reference axis in a plane 784 normal to the projection axis CX, the reference axis in the normal plane 784 being skewed at a predetermined skew angle β with respect to a vertical axis VERT defined in the normal plane 784, wherein the coupling, between the drive axis or motor 750 and the illumination assembly 710, is configured so as to maintain the illuminated object pattern or target 301, 302 substantially steady with the pattern reference axis substantially steady at the predetermined skew angle with respect to the vertical axis VERT (noting that the term vertical is used for convenience here further noting that the axis may be vertical with the camera metrology apparatus 100 arranged in the horizontal operation position and may be horizontal with the camera metrology apparatus arranged in the vertical operating position), throughout the range of motion D.

The drive section 720 includes a rotary drive axis that includes any suitable drive motor 750 (e.g., stepper motor, etc., similar to the motors described above) and a lead screw 751 coupled to a drive shaft of the drive motor 750 in any suitable manner. The drive link assembly 716 includes a nut/ball 718 that engages the lead screw 751 such that rotation of the lead screw 751 by the drive motor 750 causes linear movement of the piston 713 along the X axis within the bushing 711 and a bearing cage 712. The housing includes a first mounting member 707 to which the drive motor 750 is coupled. The first mounting member 707 is configured such that the mounting of the drive motor 750 to the first mounting member 707 is not registered to the housing 700F. For example, the lead screw 751 may be threaded into the nut/ball 718 while a position of the drive motor 750 is allowed to float freely in the lateral direction. For example, the drive motor 750 may be mounted to the first mounting member 707 through an arm 707A that is allowed to pivot about axis DX to provide free floating lateral movement of the drive motor 750, which may substantially eliminate misalignment between the drive motor 750 and the piston 713 guide assembly (e.g., the bearing cage 712 and guide member 730 described below).

The drive section 720 also includes any suitable guide member 730 (e.g., such as a precision ground pin) that is configured to interface/engage with the drive link assembly 716 for guiding movement (in addition to or in lieu of the guidance provided by the bearing cage 712) of the piston 713 along the X axis. For example, the housing includes a second mounting member 708 where both the first mounting member 707 and the second mounting member 708 include guide member mounts 730M. The guide member mounts 730M are configured to receive and secure the guide member 730 from movement. The guide member mounts 730M are also configured to orient the guide member 730 along the focus axis (e.g., the X axis) of the focusing target projector 110FTP.

The drive link assembly 716 includes at least two bearing members 732, 733 that engage the guide member 730, and form a joint commensurate with a prismatic joint, to substantially eliminate roll of the piston about the focus axis (e.g., the X axis), slop and backlash of the drive system, so as to maintain the illuminated object pattern or target 301, 302 substantially steady with the pattern reference axis substantially steady at the predetermined skew angle R, with respect to the vertical axis VERT, throughout the range of motion D. In one aspect, one of the bearing members 732 is rigidly connected to the drive link assembly 716, while other bearing member 733 is spring-loaded against the guide member 730 via a flexure cut into the drive link assembly 716 (or may be preloaded against the guide member 730 in any other suitable manner, such as with springs, etc.). The coupling between the drive section 720 and the illumination assembly 710 formed by the guide member 730 and bearing members 732, 733 provides position stability between the illuminated object pattern or target 301, 302 and the projection axis CX, throughout the range of motion D, commensurate with prismatic joint configuration stability. A biasing member 734 (such as a spring) is coupled to the housing 700F and the drive link assembly 716 so as to preload the piston 713 against the lead screw 751 of the drive motor 750 to substantially remove backlash during travel of the piston 713 in the X direction.

As described above, the guide system for the piston 713 substantially removes the backlash, play, or other unwanted movement of the piston 713 over the focus range of travel (e.g., the range of travel or distance D). The following is an exemplary table illustrating the movement of the piston 713 over the focus range of travel for different focal lengths and different apparent distances D applicable to a metrological test such as, for example, modular transfer function testing. In other aspects, the distances or focus range of travel may be more or less than those shown in the exemplary table, and the control provided may be more or less than that shown in the exemplary table for any desired range of travel to suit variance allowances based on application control parameters.

| Focal length (mm) | Reticle Defocus (from collimation) for Various Image Locations within the range of travel D (mm) Image Location (m): | | | | | Target Position Lateral Deviation (um) | Trajectory Slope (um/mm) | Target Axial Position Repeatability (um) | Allowable Target Rotation (degrees) |
|---|---|---|---|---|---|---|---|---|---|
| | 8 | 5 | 2 | 1 | 0.5 | | | | |
| 25 | 0.078 | 0.125 | 0.313 | 0.625 | 1.250 | 6.5 | 5.2 | +/−12 | +/−0.5° |
| 35 | 0.153 | 0.245 | 0.613 | 1.225 | 2.450 | 9.2 | 3.7 | | |
| 50 | 0.313 | 0.500 | 1.250 | 2.500 | 5.000 | 13.1 | 2.6 | | |
| 60 | 0.450 | 0.720 | 1.800 | 3.600 | 7.200 | 15.7 | 2.2 | | |
| 75 | 0.703 | 1.125 | 2.813 | 5.625 | 11.250 | 19.6 | 1.7 | | |
| 100 | 1.250 | 2.000 | 5.000 | 10.000 | 20.000 | 26.2 | 2.6 | | |
| 150 | 2.813 | 4.500 | 11.250 | 22.500 | 45.000 | 39.3 | 3.5 | | |
| 200 | 5.000 | 8.000 | 20.000 | 40.000 | 80.000 | 52.4 | 6.5 | | |

In one aspect, any suitable encoder 717 (such as a micro-encoder) may be mounted to the drive link assembly 716 for position location determination of the piston 713 (and the target 301, 302) along the X axis. The drive section 720 may include any suitable reader 777 for reading the encoder 717 coupled to the drive link assembly 716 for generation of and communication of target 301, 302 position signals to the controller 190.

While the focusing target projector 110FTP is described herein as having a single degree of freedom (e.g., linear traverse along the X axis for focusing) in other aspects, the focusing target projector 110FTP may be configured with two degrees of freedom, one being linear traverse along the X axis and the other being rotation of the target 301, 302 about the X axis. As such, the coupling, between the drive axis or motor 750 and the illumination assembly 710, is configured so that the predetermined skew angle β is adjustable, and the adjusted predetermined skew angle β is maintained throughout the range of motion D. For example, the drive section 720 may include any suitable rotational drive 769 for rotating the piston 713 (and the target 301, 302) about the X axis for providing rotation or roll (see FIG. 5) of the target 301, 302 (e.g., to adjust the skew angle M relative to the camera sensor 300. In one aspect, the first mounting member 707 and the second mounting member 708 may be mounted in a drive axis carriage (e.g., in a manner substantially similar to the piston 713 and bearing cage 712) so as to provide only rotation about the X axis. The drive motor 750 and the guide member 730 may be mounted to the first and second mounting member 707, 708 as above so that they rotate with the carriage about the X axis as driven by the rotational drive 769. The guide member 730 may engage the bearing members 732, 733 (additional rotational engagement members may also be provided) so that the piston 713 rotates about the X axis with the drive axis carriage to adjust the skew angle β as desired.

Figure 7G:
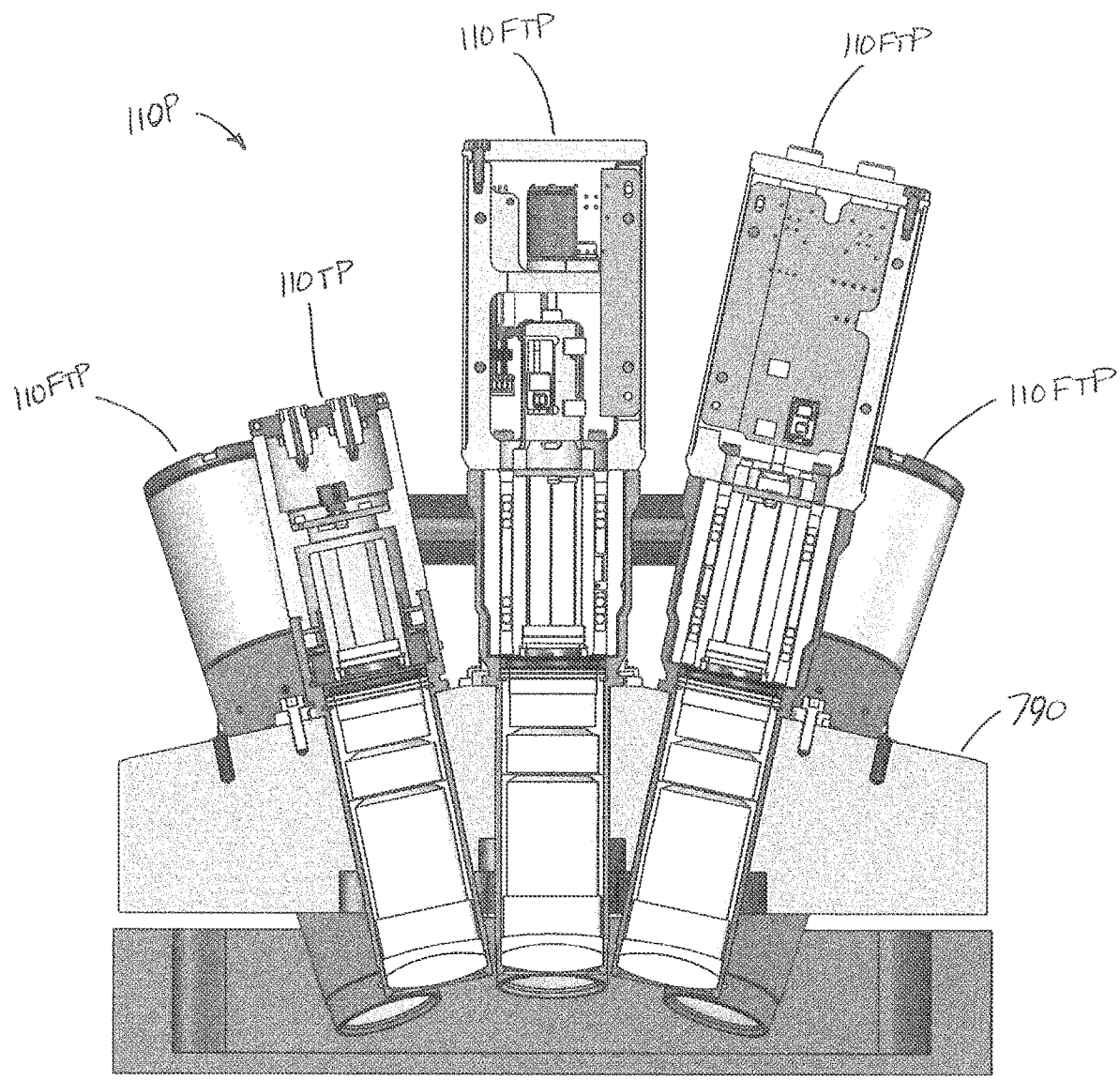
FIG. 7G is a schematic illustration of multiple accessory devices of FIG. 7A mounted to a stationary test apparatus in accordance with aspects of the present disclosure.
Figure 8D:
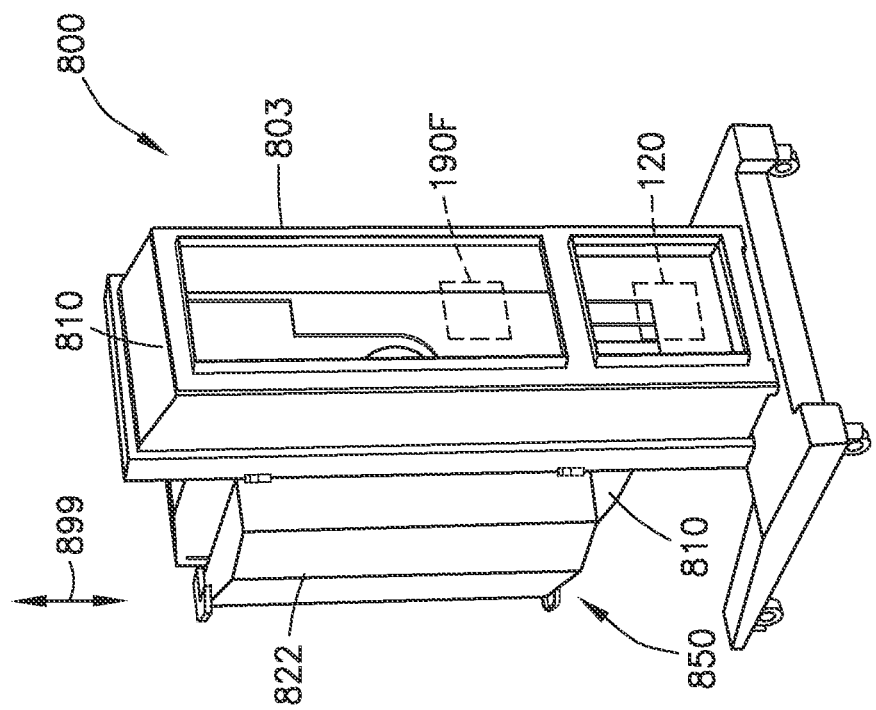
Figure 8C:
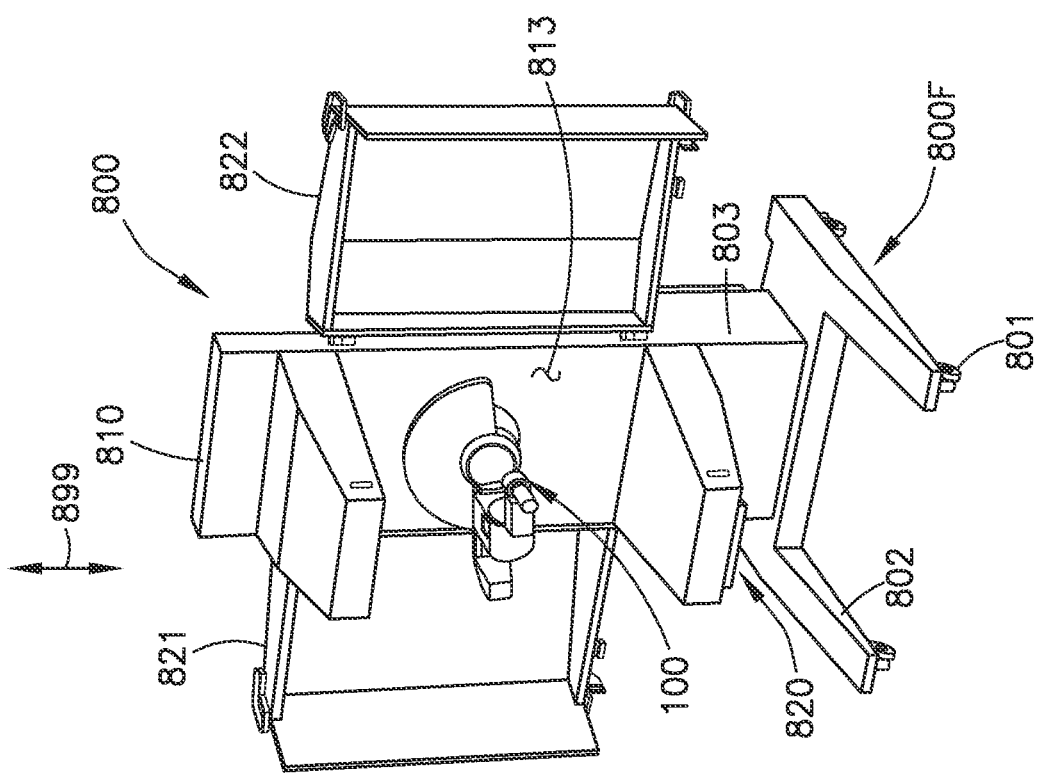
Figure 9:
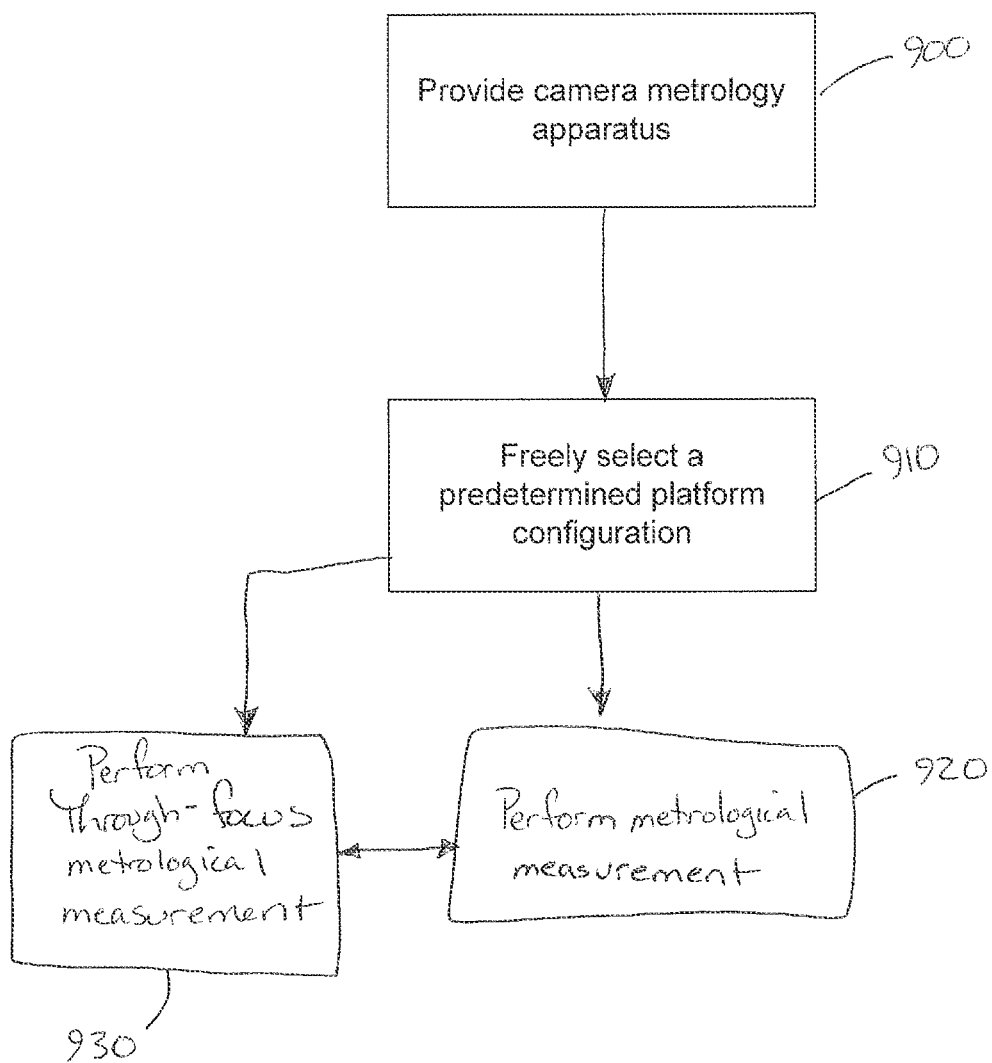
FIG. 9 is a block diagram of an exemplary method in accordance with aspects of the present disclosure.

Referring also to FIG. 7G, while the focusing target projector 110FTP is described above with respect to the camera metrology apparatus 100, the focusing target projector 110FTP may be mounted to and used in any suitable camera testing device/apparatus. For example, FIG. 7 illustrates a portion of a starfield type camera testing apparatus 790 where multiple target projectors 110P are mounted for substantially simultaneously providing targets 301, 302 across the camera sensor 300. The focusing target projector may be mounted in one or more locations of the starfield type camera testing apparatus 790 (with other focusing target projectors 110FTP and/or fixed target projectors 110TP) to, for example, perform through-focus measurements or any other suitable measurements of a device under test 111.

Referring to FIGS. 8A-8D, as described above, the camera metrology apparatus 100 may be employed in a horizontal orientation, a vertical orientation, or any other suitable orientation there between. In one aspect, an enclosure may be provided for the camera metrology apparatus 100. FIGS. 8A-8D illustrate an enclosure 800 configured to support the camera metrology apparatus 100 in, for example, the vertical orientation. As may be realized, a similar enclosure may be provided for supporting the camera metrology apparatus 100 while in the horizontal orientation. The enclosure 800 may have a frame 800F. The frame 800F may include a base 802 and a stanchion member 803 coupled to the base 802 that the stanchion member is arranged substantially vertically. Any suitable number of casters 801 may be disposed on the base 802 so that the enclosure 800 is mobile (e.g., can be pushed or pulled to different locations as desired). The stanchion member 803 includes one or more linear guides 811 (e.g., bearings, etc.) on which a test unit platform 810 is movably mounted for linear travel along the one or more linear guides 811.

The test unit platform includes a test fixture mounting surface 813 to which the camera metrology apparatus 100 is coupled in any suitable manner. The test unit platform 810 may include any suitable connections for coupling the camera metrology apparatus 100 to the power supply 120 (which may be disposed on-board or off-board the enclosure 800. For example, in one aspect, the power supply 120 may be disposed at any suitable location on the frame 800F so that the power supply 120 and the frame 800F are transported as a unit. In another aspect, the enclosure may be connected to the power supply 120 in any suitable manner. The test unit platform 810 may also include any suitable connections for coupling the camera metrology apparatus 100 to the computer 190F and/or hand held control 190G. In one aspect, the test unit platform 810 may include a communications/control interface 820 that includes any suitable connections for coupling the computer 190F (located off-board the enclosure 810), a hand held control 190G, and/or a power supply (if located off-board the enclosure 800) to the test unit platform 810. The communications/control interface 820 may provide couplings from the communications/control interface 820 to the camera metrology apparatus 100 mounted thereto in any suitable manner (such as through wired connectors, etc.) so that the camera metrology apparatus 100 is coupled to the coupling the computer 190F and/or hand held control 190G through the communications/control interface 820. In other aspects, the computer 190F may be disposed onboard the enclosure 800 where the communications/control interface 820 may provide couplings may provide couplings for connecting a keyboard, mouse, and/or graphical user interface to the computer 190F.

In still other aspects, the keyboard, mouse, and/or graphical user interface may also be disposed onboard the enclosure in any suitable manner. In one aspect, the communications/control interface may include an emergency stop switch (or the emergency stop switch may be located at any suitable position on the enclosure 810) and any suitable switching may be provided on-board the enclosure 810 to substantially immediate stop movement of the camera metrology apparatus 100 upon actuation of the emergency stop switch.

As noted above, the test unit platform 810 is mounted to the linear guides 811 of the stanchion member 803. This provides for height adjustment (in direction 899) of the test unit platform 810 (and the camera metrology apparatus 100 coupled thereto) relative to, for example, a floor on which the enclosure 800 rests. Any suitable amount of vertical travel may be provided by the stanchion member 803 for allowing the test unit platform 810 to be positioned as any suitable height. For example, the coupling between the stanchion member 803 and the test unit platform 810 may provide for about 500 mm of vertical travel, while in other aspects the amount of vertical travel provided may be more or less than about 500 mm. A locking biasing member 830 (such as a locking gas spring support member) may be provided to assist (e.g., support at least some of the weight of the test unit platform 810 and the camera metrology apparatus 100) so that the test unit platform 810 and the camera metrology apparatus 100 coupled thereto may be easily moved vertically and locked in a desired vertical location.

One or more door 821, 822 is coupled to the test unit platform 810. In one aspect the one or more door 821, 822 is removable from the test unit platform 810. When closed the one or more door 821, 822 forms a light-tight test volume 850 with the test unit platform 810.

Referring now to FIGS. 1A, 1B, 2A-2C, 4A-4C, and 9, an exemplary method for effecting metrology measurement of the device under test 111 with the camera metrology apparatus 100 will be described. The method includes providing a camera metrology apparatus 100 as described above (FIG. 9, Block 900). The method further includes freely selecting a predetermined platform configuration (FIG. 9, Block 910), of the actuation platform 167, from more than one different predetermined platform configurations, each defining a different predetermined configuration characteristic between the predetermined device under test mount interface 250 and the predetermined accessory device mount interface (such as interface 283) coupled to the actuation platform 167 effecting a different predetermined device under test 111 stimulation characteristic. The at least one device under test mount 140 and the at least one accessory device mount (such as mounts 141, 150) are arranged so as to define a repeatable relative position between the predetermined device under test mount interface 150 and the predetermined accessory device mount interface (such as interface 283) in each of the different predetermined platform configurations and effect free selection from each different predetermined platform configuration to another. Metrological measurement is performed (FIG. 9, Block 920) on the device under test 111 in any suitable manner, such as described above by controlling the different actuable stages of the camera metrology apparatus 100. In addition to or in lieu of the metrological measurement performance in Block 920, through-focus metrological measurement is performed (FIG. 9, Block 930) on the device under test 111 in any suitable manner, such as described above by controlling the focusable target projector 110FTP.

In accordance with one or more aspects of the present disclosure a camera metrology apparatus comprises:

a base section;

a drive section with multiple independent drive axes mounted to the base section; and an actuation platform movably mounted to the base section, the actuation platform having at least one camera mount, with a predetermined camera mount interface for a camera, and at least one camera stimulation source mount, with a predetermined stimulation source mount interface, and the actuation platform being operably coupled to at least one of the multiple independent drive axes so as to generate relative motion with more than one independent degrees of freedom between the predetermined camera mount interface and the predetermined stimulation source mount interface effecting metrology measurement of the camera with each of the more than one independent degrees of freedom;

wherein the actuation platform has a selectable configuration freely selectable between more than one different predetermined platform configurations, each with a different predetermined mounting location characteristic changing a predetermined mounting location relative to the actuation platform of at least one of the predetermined camera mount interface and the stimulation source mount interface and effecting a different predetermined metrology measurement characteristic, and the at least one camera mount and the at least one camera stimulation source mount are arranged so as to define a repeatable relative position between the predetermined camera mount interface and the predetermined stimulation source mount interface in each of the different platform configurations and effect free selection between each different predetermined platform configuration.

In accordance with one or more aspects of the present disclosure the at least one camera mount and the at least one stimulation source mount are arranged so as to define different repeatable relative positions between the predetermined camera mount interface and the predetermined stimulation source mount interface, each for a respective one of the different predetermined platform configurations and different predetermined metrology measurement characteristic corresponding thereto.

In accordance with one or more aspects of the present disclosure at least one of the at least one camera mount and the at least one stimulation source mount is configured so as to be mounted in different predetermined mounting locations on an actuation stage of the actuation platform.

In accordance with one or more aspects of the present disclosure at least one of the at least one camera mount and the at least one stimulation source mount is configured so as to be mounted in different predetermined mounting locations on the base section, and wherein at least one of the more than one different predetermined platform configurations is defined by the at least one of the at least one camera mount and the at least one stimulation source mount mounted in at least one of the different predetermined mounting locations on the base section.

In accordance with one or more aspects of the present disclosure the base section has more than one predetermined mounting locations thereon for at least one of the at least one camera mount and the at least one stimulation source mount, wherein coupling of the at least one of the predetermined camera mount interface and the predetermined stimulation source mount interface with each of the more than one predetermined mounting locations, of the base section, effects selection of at least one of the more than one different predetermined platform configurations.

In accordance with one or more aspects of the present disclosure, the apparatus further comprises a controller communicably connected to at least one of the more than one predetermined mounting locations of the base section so as to automatically register coupling of the at least one of the at least one camera mount and the at least one stimulation source mount to the at least one of the more than one predetermined mounting location, and select the at least one of the more than one different predetermined platform configurations.

In accordance with one or more aspects of the present disclosure the controller is arranged to automatically generate parameters of the relative motion between the predetermined camera mount interface and the predetermined stimulation source mount interface based on registration of a selected one of the more than one different predetermined platform configurations.

In accordance with one or more aspects of the present disclosure the drive section has three independent drive axes, and the actuation platform comprises more than one actuable stage each providing at least one independent degree of freedom from the more than one independent degrees of freedom of the actuation platform.

In accordance with one or more aspects of the present disclosure the predetermined camera stimulation source mount comprises different interchangeable camera stimulation source mounts, each configured so as to be interchangeably mounted to an actuable stage of the actuation platform or the base section, and with a different interface conforming to a different respective camera stimulation source effecting a different corresponding camera stimulation characteristic.

In accordance with one or more aspects of the present disclosure the base section, the drive section, and the actuation platform are configured so that the camera metrology apparatus operates in both an upright orientation, in a horizontal orientation, and any suitable orientation there between;

wherein in the upright orientation, the base section is oriented substantially upright with the camera, held by the predetermined camera mount interface of the at least one camera mount, oriented with an imaging sensor of the camera in a substantially horizontal orientation; and wherein in the horizontal orientation, the base section is oriented substantially horizontally with the camera, held by the predetermined camera mount interface of the at least one camera mount, oriented with the imaging sensor of the camera in a substantially vertical orientation.

In accordance with one or more aspects of the present disclosure the drive section has at least one drive axis that includes a harmonic drive, the at least one drive axis defining at least one of the more than one independent degrees of freedom of the actuation platform.

In accordance with one or more aspects of the present disclosure the actuation platform has two degrees of freedom driven by two independent drive axes of the drive section, each of the two independent drive axes having a harmonic drive.

In accordance with one or more aspects of the present disclosure at least one of the more than one independent degrees of freedom of the actuation platform effecting the metrology measurement is actuated by one of the multiple independent drive axes arranged so as to generate substantially infinite rotation.

In accordance with one or more aspects of the present disclosure at least one of the multiple independent drive axes has a drive shaft including a slip ring power coupling.

In accordance with one or more aspects of the present disclosure a camera metrology apparatus comprises:

a base section;

a drive section with multiple independent drive axes mounted to the base section; and an actuation platform movably mounted to the base section, the actuation platform having at least one camera mount, with a predetermined camera mount interface for a camera, and at least one camera stimulation source mount, with a predetermined stimulation source mount interface, and the actuation platform being operably coupled to at least one of the multiple independent drive axes so as to generate relative motion with more than one independent degrees of freedom between the predetermined camera mount interface and the predetermined stimulation source mount interface effecting metrology measurement of the camera with each of the more than one independent degrees of freedom;

wherein the actuation platform has a selectable configuration freely selectable between more than one different predetermined platform configurations, each defining a different predetermined configuration characteristic between the predetermined camera mount interface and the predetermined stimulation source mount interface coupled to the actuation platform effecting a different predetermined camera stimulation characteristic, and the at least one camera mount and the at least one camera stimulation source mount are arranged so as to define a repeatable relative position between the predetermined camera mount interface and the predetermined stimulation source mount interface in each of the different predetermined platform configurations and effect free selection from each different predetermined platform configuration to another.

In accordance with one or more aspects of the present disclosure the at least one camera mount and the at least one camera stimulation source mount each have couplings arranged for removably coupling the at least one camera mount and the at least one camera stimulation source mount respectively with at least one of an actuable stage of the actuation platform and the base section in each of the different predetermined platform configurations, and wherein the repeatable relative position is set upon coupling the at least one camera mount and the at least one camera stimulation source mount with the at least one of the actuable stage and the base section.

In accordance with one or more aspects of the present disclosure the repeatable relative position is set substantially automatically upon coupling the at least one camera mount and the at least one camera stimulation source mount with the at least one of the actuable stage and the base section and at each of the different predetermined platform configurations.

In accordance with one or more aspects of the present disclosure the repeatable relative position, set upon coupling at each of the different predetermined platform configurations, conforms to respective camera stimulus parameters of the different predetermined camera stimulation characteristic corresponding to the more than one different predetermined platform configurations independent of calibration between the predetermined camera mount interface and the predetermined stimulation source mount interface post coupling.

In accordance with one or more aspects of the present disclosure at least one of the at least one camera mount and the at least one camera stimulation source mount have kinematic couplings.

In accordance with one or more aspects of the present disclosure at least one of the at least one camera mount and the at least one camera stimulation source mount is configured so as to be mounted in different predetermined mounting locations on an actuation stage of the actuation platform.

In accordance with one or more aspects of the present disclosure at least one of the at least one camera mount and the at least one camera stimulation source mount is configured so as to be mounted in different predetermined mounting locations on the base section, and wherein at least one of the more than one different predetermined platform configurations is defined by the at least one of the at least one camera mount and the at least one camera stimulation source mount mounted in at least one of the different predetermined mounting locations on the base section.

In accordance with one or more aspects of the present disclosure the base section has more than one predetermined mounting locations thereon for at least one of the at least one camera mount and the at least one camera stimulation source mount, wherein coupling of the at least one of the predetermined camera mount interface and the predetermined stimulation source mount interface with each of the more than one predetermined mounting locations, of the base section, effects selection of at least one of the more than one different predetermined platform configurations.

In accordance with one or more aspects of the present disclosure, the apparatus further comprises a controller communicably connected to at least one of the more than one predetermined mounting locations of the base section so as to automatically register coupling of the at least one of the at least one camera mount and the at least one camera stimulation source mount to the at least one of the more than one predetermined mounting location, and select the at least one of the more than one different predetermined platform configurations.

In accordance with one or more aspects of the present disclosure the base section, the drive section, and the actuation platform are configured so that the camera metrology apparatus operates in both an upright orientation and in a horizontal orientation;

wherein in the upright orientation, the base section is oriented substantially upright with the camera, held by the predetermined camera mount interface of the at least one camera mount, oriented with an imaging sensor of the camera in a substantially horizontal orientation; and wherein in the horizontal orientation, the base section is oriented substantially horizontally with the camera, held by the predetermined camera mount interface of the at least one camera mount, oriented with the imaging sensor of the camera in a substantially vertical orientation.

In accordance with one or more aspects of the present disclosure the drive section has at least one drive axis that includes a harmonic drive, the at least one drive axis defining at least one of the more than one independent degrees of freedom of the actuation platform.

In accordance with one or more aspects of the present disclosure the actuation platform has two degrees of freedom driven by two independent drive axes of the drive section, each of the two independent drive axes having a harmonic drive.

In accordance with one or more aspects of the present disclosure at least one of the more than one independent degrees of freedom of the actuation platform effecting the metrology measurement is actuated by one of the multiple independent drive axes arranged so as to generate substantially infinite rotation.

In accordance with one or more aspects of the present disclosure at least one of the multiple independent drive axes has a drive shaft including a slip ring power coupling.

In accordance with one or more aspects of the present disclosure a method for effecting metrology measurement of a camera is provided. The method comprises:

providing a camera metrology apparatus having
a base section,
a drive section with multiple independent drive axes mounted to the base section, and
an actuation platform movably mounted to the base section, the actuation platform having at least one camera mount, with a predetermined camera mount interface for a camera, and at least one camera stimulation source mount, with a predetermined stimulation source mount interface, the actuation platform being operably coupled to at least one of the multiple independent drive axes so as to generate relative motion with more than one independent degrees of freedom between the predetermined camera mount interface and the predetermined stimulation source mount interface effecting metrology measurement of the camera with each of the more than one independent degrees of freedom; and freely selecting a predetermined platform configuration, of the actuation platform, from more than one different predetermined platform configurations, each defining a different predetermined configuration characteristic between the predetermined camera mount interface and the predetermined stimulation source mount interface coupled to the actuation platform effecting a different predetermined camera stimulation characteristic, and the at least one camera mount and the at least one camera stimulation source mount are arranged so as to define a repeatable relative position between the predetermined camera mount interface and the predetermined stimulation source mount interface in each of the different predetermined platform configurations and effect free selection from each different predetermined platform configuration to another.

In accordance with one or more aspects of the present disclosure, the method further comprises:

removably coupling the at least one camera mount and the at least one camera stimulation source mount respectively with at least one of an actuable stage of the actuation platform and the base section in each of the different predetermined platform configurations; and setting the repeatable relative position upon coupling the at least one camera mount and the at least one camera stimulation source mount with the at least one of the actuable stage and the base section.

In accordance with one or more aspects of the present disclosure, the method further comprises setting the repeatable relative position substantially automatically upon coupling the at least one camera mount and the at least one camera stimulation source mount with the at least one of the actuable stage and the base section and at each of the different predetermined platform configurations.

In accordance with one or more aspects of the present disclosure the repeatable relative position, set upon coupling at each of the different predetermined platform configurations, conforms to respective camera stimulus parameters of the different predetermined camera stimulation characteristic corresponding to the more than one different predetermined platform configurations independent of calibration between the predetermined camera mount interface and the predetermined stimulation source mount interface post coupling.

In accordance with one or more aspects of the present disclosure, the method further comprises providing at least one of the at least one camera mount and the at least one camera stimulation source mount with kinematic couplings.

In accordance with one or more aspects of the present disclosure, the method further comprises mounting at least one of the at least one camera mount and the at least one camera stimulation source mount in different predetermined mounting locations on an actuation stage of the actuation platform.

In accordance with one or more aspects of the present disclosure, the method further comprises mounting at least one of the at least one camera mount and the at least one camera stimulation source mount in different predetermined mounting locations on the base section, and wherein at least one of the more than one different predetermined platform configurations is defined by the at least one of the at least one camera mount and the at least one camera stimulation source mount mounted in at least one of the different predetermined mounting locations on the base section.

In accordance with one or more aspects of the present disclosure the base section has more than one predetermined mounting locations thereon for at least one of the at least one camera mount and the at least one camera stimulation source mount, the method further comprising:

effecting selection of at least one of the more than one different predetermined platform configurations by coupling the at least one of the predetermined camera mount interface and the predetermined stimulation source mount interface with each of the more than one predetermined mounting locations, of the base section.

In accordance with one or more aspects of the present disclosure, the method further comprises:

automatically registering, with a controller communicably connected to at least one of the more than one predetermined mounting locations of the base section, coupling of the at least one of the at least one camera mount and the at least one camera stimulation source mount to the at least one of the more than one predetermined mounting location; and selecting, with the controller, the at least one of the more than one different predetermined platform configurations.

In accordance with one or more aspects of the present disclosure, the method further comprises:

operating the camera metrology apparatus an upright orientation or in a horizontal orientation;

wherein in the upright orientation, the base section is oriented substantially upright with the camera, held by the predetermined camera mount interface of the at least one camera mount, oriented with an imaging sensor of the camera in a substantially horizontal orientation; and wherein in the horizontal orientation, the base section is oriented substantially horizontally with the camera, held by the predetermined camera mount interface of the at least one camera mount, oriented with the imaging sensor of the camera in a substantially vertical orientation.

In accordance with one or more aspects of the present disclosure, the method further comprises providing the drive section with at least one drive axis that includes a harmonic drive, the at least one drive axis defining at least one of the more than one independent degrees of freedom of the actuation platform.

In accordance with one or more aspects of the present disclosure, the method further comprises driving two degrees of freedom of the actuation platform with two independent drive axes of the drive section where each of the two independent drive axes are provided with a harmonic drive.

In accordance with one or more aspects of the present disclosure, the method further comprises actuating at least one of the more than one independent degrees of freedom of the actuation platform, effecting the metrology measurement, with one of the multiple independent drive axes arranged so as to generate substantially infinite rotation.

In accordance with one or more aspects of the present disclosure, the method further comprises providing a drive shaft of at least one of the multiple independent drive axes with a slip ring power coupling.

In accordance with one or more aspects of the present disclosure a target projector apparatus for a camera metrology tool is provided. The apparatus comprises:

a housing with a projector portion having a projector assembly of predetermined lens and projector elements mounted therein defining a projection axis and having a predetermined focal location;

an illumination assembly with an illumination source and object pattern illuminated by the illumination source and disposed in a predetermined position relative to the projection axis of the projector assembly so that an image of the illuminated object pattern projected through the projector assembly out from an aperture of the housing appears substantially at the predetermined position relative to the projection axis; and a drive section with a drive axis operably coupled, by a coupling within the housing, to the illumination assembly so as to move at least the illuminated object pattern relative to the predetermined focal location, of the projector assembly, in a direction of motion aligned with the projection axis and in a range of motion about the predetermined focal location, wherein the coupling is configured so as to maintain the illuminated object pattern substantially steady in the predetermined position relative to the projection axis throughout the range of motion.

In accordance with one or more aspects of the present disclosure the object pattern has a predetermined pattern reference axis in a plane normal to the projection axis, the reference axis in the normal plane being skewed at a predetermined skew angle with respect to a vertical axis defined in the normal plane, wherein the coupling is configured so as to maintain the illuminated object pattern substantially steady with the pattern reference axis substantially steady at the predetermined skew angle, with respect to the vertical axis, throughout the range of motion.

In accordance with one or more aspects of the present disclosure the coupling is configured so that the predetermined skew angle is adjustable, and the adjusted predetermined skew angle is maintained throughout the range of motion.

In accordance with one or more aspects of the present disclosure the drive axis is a stepper motor.

In accordance with one or more aspects of the present disclosure the coupling configuration provides position stability between the illuminated object pattern and projection axis, throughout the range of motion, commensurate with prismatic joint configuration stability.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the disclosed embodiment.

What is claimed is:

1. A camera metrology apparatus comprising:
a base section;
a drive section with multiple independent drive axes mounted to the base section; and
an actuation platform movably mounted to the base section, the actuation platform having
at least one camera mount, with a predetermined camera mount interface for a camera, and
at least one camera stimulation source mount, with a predetermined stimulation source mount interface, and
the actuation platform being operably coupled to at least one of the multiple independent drive axes so as to generate relative motion with more than one independent degrees of freedom between the predetermined camera mount interface and the predetermined stimulation source mount interface effecting metrology measurement of the camera with each of the more than one independent degrees of freedom;
wherein the actuation platform has a selectable configuration freely selectable between more than one different predetermined platform configurations, each with a different predetermined mounting location characteristic changing a predetermined mounting location relative to the actuation platform of at least one of the predetermined camera mount interface and the stimulation source mount interface and effecting a different predetermined metrology measurement characteristic, and the at least one camera mount and the at least one camera stimulation source mount are arranged so as to define a repeatable relative position between the predetermined camera mount interface and the predetermined stimulation source mount interface in each of the different platform configurations and effect free selection between each different predetermined platform configuration.

2. The apparatus of claim 1, wherein the at least one camera mount and the at least one stimulation source mount are arranged so as to define different repeatable relative positions between the predetermined camera mount interface and the predetermined stimulation source mount interface, each for a respective one of the different predetermined platform configurations and different predetermined metrology measurement characteristic corresponding thereto.

3. The apparatus of claim 1, wherein at least one of the at least one camera mount and the at least one stimulation source mount is configured so as to be mounted in different predetermined mounting locations on an actuation stage of the actuation platform.

4. The apparatus of claim 1, wherein at least one of the at least one camera mount and the at least one stimulation source mount is configured so as to be mounted in different predetermined mounting locations on the base section, and wherein at least one of the more than one different predetermined platform configurations is defined by the at least one of the at least one camera mount and the at least one stimulation source mount mounted in at least one of the different predetermined mounting locations on the base section.

5. The apparatus of claim 1, wherein the base section has more than one predetermined mounting locations thereon for at least one of the at least one camera mount and the at least one stimulation source mount, wherein coupling of the at least one of the predetermined camera mount interface and the predetermined stimulation source mount interface with each of the more than one predetermined mounting locations, of the base section, effects selection of at least one of the more than one different predetermined platform configurations.

6. The apparatus of claim 5, further comprising a controller communicably connected to at least one of the more than one predetermined mounting locations of the base section so as to
automatically register coupling of the at least one of the at least one camera mount and the at least one stimulation source mount to the at least one of the more than one predetermined mounting location, and
select the at least one of the more than one different predetermined platform configurations.

7. The apparatus of claim 6, wherein the controller is arranged to automatically generate parameters of the relative motion between the predetermined camera mount interface and the predetermined stimulation source mount interface based on registration of a selected one of the more than one different predetermined platform configurations.

8. The apparatus of claim 1, wherein the drive section has three independent drive axes, and the actuation platform comprises more than one actuable stage each providing at least one independent degree of freedom from the more than one independent degrees of freedom of the actuation platform.

9. The apparatus of claim 1, wherein the predetermined camera stimulation source mount comprises different interchangeable camera stimulation source mounts, each configured so as to be interchangeably mounted to an actuable stage of the actuation platform or the base section, and with a different interface conforming to a different respective camera stimulation source effecting a different corresponding camera stimulation characteristic.

10. The apparatus of claim 1, wherein the base section, the drive section, and the actuation platform are configured so that the camera metrology apparatus operates in both an upright orientation and in a horizontal orientation;
wherein in the upright orientation, the base section is oriented substantially upright with the camera, held by the predetermined camera mount interface of the at least one camera mount, oriented with an imaging sensor of the camera in a substantially horizontal orientation; and
wherein in the horizontal orientation, the base section is oriented substantially horizontally with the camera, held by the predetermined camera mount interface of the at least one camera mount, oriented with the imaging sensor of the camera in a substantially vertical orientation.

11. The apparatus of claim 1, wherein the drive section has at least one drive axis that includes a harmonic drive, the at least one drive axis defining at least one of the more than one independent degrees of freedom of the actuation platform.

12. The apparatus of claim 11, wherein the actuation platform has two degrees of freedom driven by two independent drive axes of the drive section, each of the two independent drive axes having a harmonic drive.

13. The apparatus of claim 1, wherein at least one of the more than one independent degrees of freedom of the actuation platform effecting the metrology measurement is actuated by one of the multiple independent drive axes arranged so as to generate substantially infinite rotation.

14. The apparatus of claim 1, wherein at least one of the multiple independent drive axes has a drive shaft including a slip ring power coupling.

15. A camera metrology apparatus comprising:
a base section;
a drive section with multiple independent drive axes mounted to the base section; and
an actuation platform movably mounted to the base section, the actuation platform having
at least one camera mount, with a predetermined camera mount interface for a camera, and
at least one camera stimulation source mount, with a predetermined stimulation source mount interface, and
the actuation platform being operably coupled to at least one of the multiple independent drive axes so as to generate relative motion with more than one independent degrees of freedom between the predetermined camera mount interface and the predetermined stimulation source mount interface effecting metrology measurement of the camera with each of the more than one independent degrees of freedom;
wherein the actuation platform has a selectable configuration freely selectable between more than one different predetermined platform configurations, each defining a different predetermined configuration characteristic between the predetermined camera mount interface and the predetermined stimulation source mount interface coupled to the actuation platform effecting a different predetermined camera stimulation characteristic, and the at least one camera mount and the at least one camera stimulation source mount are arranged so as to define a repeatable relative position between the predetermined camera mount interface and the predetermined stimulation source mount interface in each of the different predetermined platform configurations and effect free selection from each different predetermined platform configuration to another.

16. The apparatus of claim 15, wherein the at least one camera mount and the at least one camera stimulation source mount each have couplings arranged for removably coupling the at least one camera mount and the at least one camera stimulation source mount respectively with at least one of an actuable stage of the actuation platform and the base section in each of the different predetermined platform configurations, and wherein the repeatable relative position is set upon coupling the at least one camera mount and the at least one camera stimulation source mount with the at least one of the actuable stage and the base section.

17. The apparatus of claim 16, wherein the repeatable relative position is set substantially automatically upon coupling the at least one camera mount and the at least one camera stimulation source mount with the at least one of the actuable stage and the base section and at each of the different predetermined platform configurations.

18. The apparatus of claim 16, wherein the repeatable relative position, set upon coupling at each of the different predetermined platform configurations, conforms to respective camera stimulus parameters of the different predetermined camera stimulation characteristic corresponding to the more than one different predetermined platform configurations independent of calibration between the predetermined camera mount interface and the predetermined stimulation source mount interface post coupling.

19. The apparatus of claim 16, wherein at least one of the at least one camera mount and the at least one camera stimulation source mount have kinematic couplings.

20. The apparatus of claim 15, wherein at least one of the at least one camera mount and the at least one camera stimulation source mount is configured so as to be mounted in different predetermined mounting locations on an actuation stage of the actuation platform.

21. The apparatus of claim 15, wherein at least one of the at least one camera mount and the at least one camera stimulation source mount is configured so as to be mounted in different predetermined mounting locations on the base section, and wherein at least one of the more than one different predetermined platform configurations is defined by the at least one of the at least one camera mount and the at least one camera stimulation source mount mounted in at least one of the different predetermined mounting locations on the base section.

22. The apparatus of claim 15, wherein the base section has more than one predetermined mounting locations thereon for at least one of the at least one camera mount and the at least one camera stimulation source mount, wherein coupling of the at least one of the predetermined camera mount interface and the predetermined stimulation source mount interface with each of the more than one predetermined mounting locations, of the base section, effects selection of at least one of the more than one different predetermined platform configurations.

23. The apparatus of claim 22, further comprising a controller communicably connected to at least one of the more than one predetermined mounting locations of the base section so as to
automatically register coupling of the at least one of the at least one camera mount and the at least one camera stimulation source mount to the at least one of the more than one predetermined mounting location, and
select the at least one of the more than one different predetermined platform configurations.

24. The apparatus of claim 15, wherein the base section, the drive section, and the actuation platform are configured so that the camera metrology apparatus operates in both an upright orientation and in a horizontal orientation;
wherein in the upright orientation, the base section is oriented substantially upright with the camera, held by the predetermined camera mount interface of the at least one camera mount, oriented with an imaging sensor of the camera in a substantially horizontal orientation; and
wherein in the horizontal orientation, the base section is oriented substantially horizontally with the camera, held by the predetermined camera mount interface of the at least one camera mount, oriented with the imaging sensor of the camera in a substantially vertical orientation.

25. The apparatus of claim 15, wherein the drive section has at least one drive axis that includes a harmonic drive, the at least one drive axis defining at least one of the more than one independent degrees of freedom of the actuation platform.

26. The apparatus of claim 25, wherein the actuation platform has two degrees of freedom driven by two independent drive axes of the drive section, each of the two independent drive axes having a harmonic drive.

27. The apparatus of claim 15, wherein at least one of the more than one independent degrees of freedom of the actuation platform effecting the metrology measurement is actuated by one of the multiple independent drive axes arranged so as to generate substantially infinite rotation.

28. The apparatus of claim 15, wherein at least one of the multiple independent drive axes has a drive shaft including a slip ring power coupling.

29. A method for effecting metrology measurement of a camera, the method comprising:
providing a camera metrology apparatus having
a base section,
a drive section with multiple independent drive axes mounted to the base section, and
an actuation platform movably mounted to the base section, the actuation platform having at least one camera mount, with a predetermined camera mount interface for a camera, and at least one camera stimulation source mount, with a predetermined stimulation source mount interface, the actuation platform being operably coupled to at least one of the multiple independent drive axes so as to generate relative motion with more than one independent degrees of freedom between the predetermined camera mount interface and the predetermined stimulation source mount interface effecting metrology measurement of the camera with each of the more than one independent degrees of freedom; and
freely selecting a predetermined platform configuration, of the actuation platform, from more than one different predetermined platform configurations, each defining a different predetermined configuration characteristic between the predetermined camera mount interface and the predetermined stimulation source mount interface coupled to the actuation platform effecting a different predetermined camera stimulation characteristic, and the at least one camera mount and the at least one camera stimulation source mount are arranged so as to define a repeatable relative position between the predetermined camera mount interface and the predetermined stimulation source mount interface in each of the different predetermined platform configurations and effect free selection from each different predetermined platform configuration to another.

30. The method of claim 29, further comprising:
removably coupling the at least one camera mount and the at least one camera stimulation source mount respectively with at least one of an actuable stage of the actuation platform and the base section in each of the different predetermined platform configurations; and
setting the repeatable relative position upon coupling the at least one camera mount and the at least one camera stimulation source mount with the at least one of the actuable stage and the base section.

31. The method of claim 30, further comprising setting the repeatable relative position substantially automatically upon coupling the at least one camera mount and the at least one camera stimulation source mount with the at least one of the actuable stage and the base section and at each of the different predetermined platform configurations.

32. The method of claim 30, wherein the repeatable relative position, set upon coupling at each of the different predetermined platform configurations, conforms to respective camera stimulus parameters of the different predetermined camera stimulation characteristic corresponding to the more than one different predetermined platform configurations independent of calibration between the predetermined camera mount interface and the predetermined stimulation source mount interface post coupling.

33. The method of claim 30, further comprising providing at least one of the at least one camera mount and the at least one camera stimulation source mount with kinematic couplings.

34. The method of claim 29, further comprising mounting at least one of the at least one camera mount and the at least one camera stimulation source mount in different predetermined mounting locations on an actuation stage of the actuation platform.

35. The method of claim 29, further comprising mounting at least one of the at least one camera mount and the at least one camera stimulation source mount in different predetermined mounting locations on the base section, and wherein at least one of the more than one different predetermined platform configurations is defined by the at least one of the at least one camera mount and the at least one camera stimulation source mount mounted in at least one of the different predetermined mounting locations on the base section.

36. The method of claim 29, wherein the base section has more than one predetermined mounting locations thereon for at least one of the at least one camera mount and the at least one camera stimulation source mount, the method further comprising:
effecting selection of at least one of the more than one different predetermined platform configurations by coupling the at least one of the predetermined camera mount interface and the predetermined stimulation source mount interface with each of the more than one predetermined mounting locations, of the base section.

37. The method of claim 36, further comprising:
automatically registering, with a controller communicably connected to at least one of the more than one predetermined mounting locations of the base section, coupling of the at least one of the at least one camera mount and the at least one camera stimulation source mount to the at least one of the more than one predetermined mounting location; and
selecting, with the controller, the at least one of the more than one different predetermined platform configurations.

38. The method of claim 29, further comprising:
operating the camera metrology apparatus an upright orientation or in a horizontal orientation;
wherein in the upright orientation, the base section is oriented substantially upright with the camera, held by the predetermined camera mount interface of the at least one camera mount, oriented with an imaging sensor of the camera in a substantially horizontal orientation; and
wherein in the horizontal orientation, the base section is oriented substantially horizontally with the camera, held by the predetermined camera mount interface of the at least one camera mount, oriented with the imaging sensor of the camera in a substantially vertical orientation.

39. The method of claim 29, further comprising providing the drive section with at least one drive axis that includes a harmonic drive, the at least one drive axis defining at least one of the more than one independent degrees of freedom of the actuation platform.

40. The method of claim 39, further comprising driving two degrees of freedom of the actuation platform with two independent drive axes of the drive section where each of the two independent drive axes are provided with a harmonic drive.

41. The method of claim 29, further comprising actuating at least one of the more than one independent degrees of freedom of the actuation platform, effecting the metrology measurement, with one of the multiple independent drive axes arranged so as to generate substantially infinite rotation.

42. The method of claim 29, further comprising providing a drive shaft of at least one of the multiple independent drive axes with a slip ring power coupling.

* * * * *